United States Patent
Uchida

(10) Patent No.: US 8,948,585 B2
(45) Date of Patent: Feb. 3, 2015

(54) IMAGING DEVICE, IMAGING METHOD, AND RECORDING MEDIUM

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/229,390

(22) Filed: Mar. 28, 2014

(65) Prior Publication Data

US 2014/0211070 A1    Jul. 31, 2014

Related U.S. Application Data

(63) Continuation of application No. PCT/JP2012/074488, filed on Sep. 25, 2012.

(30) Foreign Application Priority Data

Sep. 30, 2011  (JP) .................................. 2011-217890

(51) Int. Cl.
| | |
|---|---|
| G03B 17/20 | (2006.01) |
| H04N 5/232 | (2006.01) |
| G03B 13/12 | (2006.01) |
| G03B 13/02 | (2006.01) |

(52) U.S. Cl.
CPC ............ *H04N 5/23296* (2013.01); *G03B 13/12* (2013.01); *G03B 17/20* (2013.01); *H04N 5/23293* (2013.01); *G03B 13/02* (2013.01)
USPC ...................................................... 396/379

(58) Field of Classification Search
CPC .................................................... G02B 23/145
USPC .......................................................... 396/379
See application file for complete search history.

(56) References Cited

U.S. PATENT DOCUMENTS

| | | | | |
|---|---|---|---|---|
| 2002/0071669 | A1* | 6/2002 | Omiya ......................... | 396/175 |
| 2003/0165336 | A1* | 9/2003 | Kato et al. .................... | 396/379 |
| 2006/0233540 | A1* | 10/2006 | Motobayashi ................. | 396/84 |

(Continued)

FOREIGN PATENT DOCUMENTS

| | | |
|---|---|---|
| JP | 3-96933 A | 4/1991 |
| JP | 5-191704 A | 7/1993 |

(Continued)

OTHER PUBLICATIONS

International Search Report for PCT/JP2012/074488 mailed on Oct. 30, 2012.
Written Opinion of the International Searching Authority for PCT/JP2012/074488 mailed on Oct. 30, 2012.

*Primary Examiner* — Clayton E Laballe
*Assistant Examiner* — Dennis Hancock
(74) *Attorney, Agent, or Firm* — Birch, Stewart, Kolasch & Birch, LLP

(57) ABSTRACT

An imaging method includes imaging light from an object passed through an imaging optical system to acquire a taken image, changing an imaging magnification of the imaging optical system, and switching a finder magnification of a finder optical system different from the imaging optical system from a first finder magnification to a second finder magnification when the imaging magnification increases and switching the finder magnification from the second finder magnification to the first finder magnification when the imaging magnification decreases.

9 Claims, 31 Drawing Sheets

(56) References Cited

U.S. PATENT DOCUMENTS

| | | | |
|---|---|---|---|
| 2008/0084493 A1* | 4/2008 | Ochi | 348/341 |
| 2008/0198452 A1* | 8/2008 | Fujihara | 359/432 |
| 2011/0074978 A1 | 3/2011 | Kogane et al. | |

FOREIGN PATENT DOCUMENTS

| | | |
|---|---|---|
| JP | 11-142721 A | 5/1999 |
| JP | 2002-189167 A | 7/2002 |
| JP | 2010-41186 A | 2/2010 |

* cited by examiner

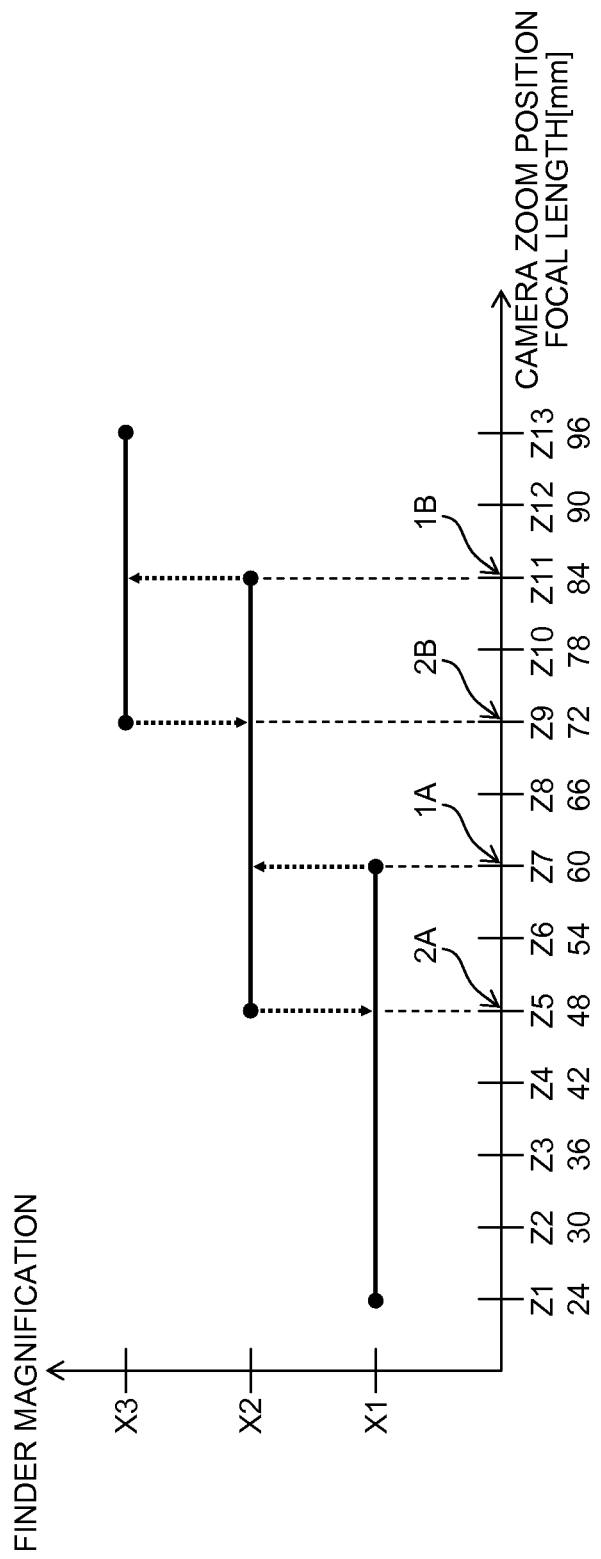

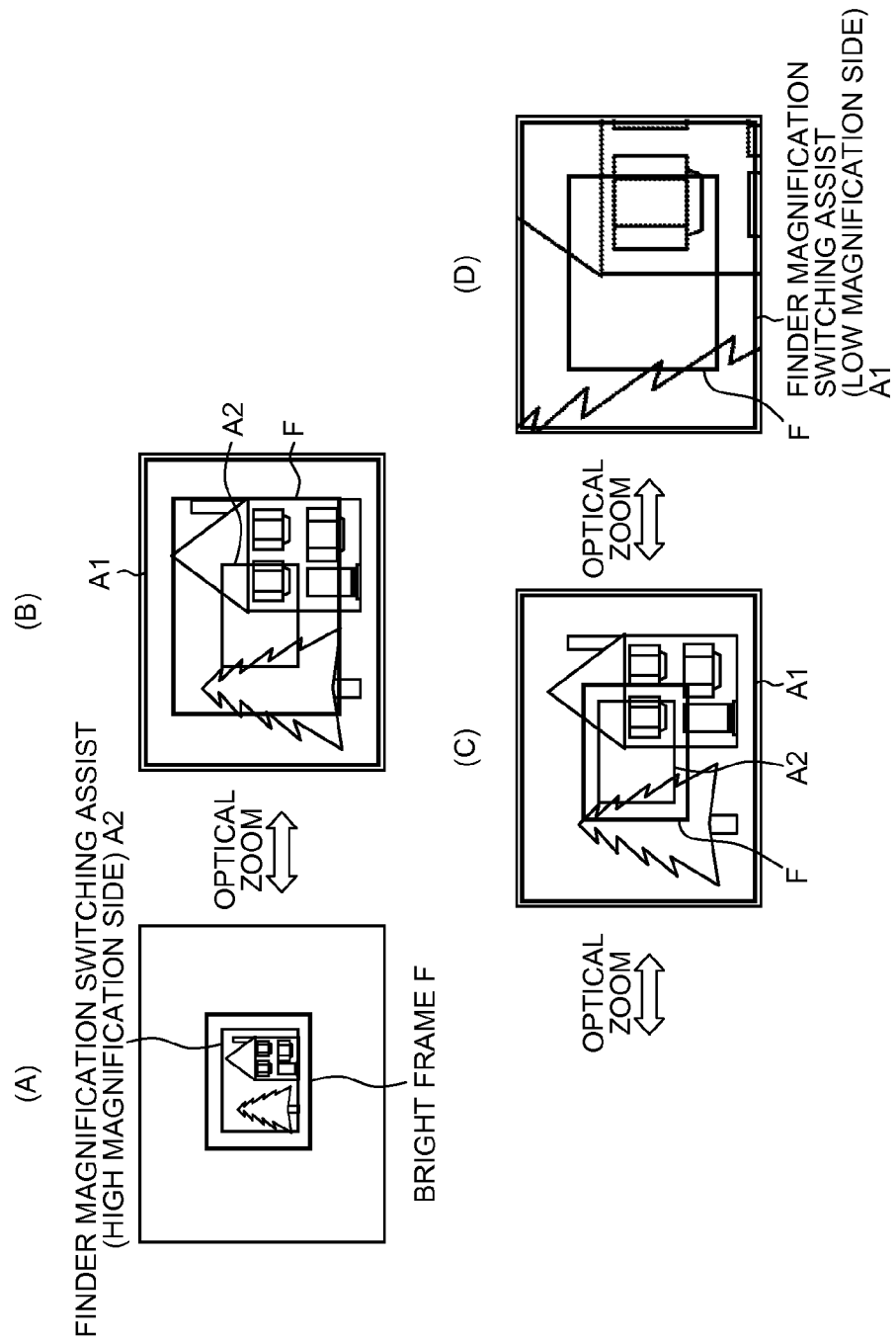

IMAGING DEVICE, IMAGING METHOD, AND RECORDING MEDIUM

CROSS REFERENCE TO RELATED APPLICATIONS

This non-provisional application is a Continuation of International Application No. PCT/JP2012/074488 filed on Sep. 25, 2012, which claims priority to Japanese Patent Application No. 2011-217890 filed in Japan on Sep. 30, 2011. The entire contents of all of the above applications are hereby incorporated by reference.

BACKGROUND OF THE INVENTION

1. Field of the Invention

The presently disclosed subject matter relates to an imaging device, an imaging method, a recording medium and a program and, more particularly, to an imaging device, an imaging method, a recording medium and a program including an optical finder capable of varying magnification.

2. Description of the Related Art

An imaging device including an optical system for an optical finder separately from an optical system for imaging performs a zooming operation and a focusing operation concerning the optical system for the optical finder according to a zooming operation and a focusing operation for the optical system for imaging.

However, if the magnification of the finder optical system is simply switched according to zoom magnification of the imaging optical system, when a zoom of the imaging optical system is moved before and after a certain zoom position, the finder magnification switching, that is, hunting frequently occurs. In such a case, it is difficult for a user to determine a zoom position (an angle of view) while looking through an optical finder and a camera is less user-friendly. When the focusing operation is performed, similarly, hunting occurs when a focusing position is moved before and after a certain focusing position.

In order to cope with such a problem, Japanese Patent Application Laid-Open No. H11-142721 discloses an imaging device that, in discretely switching a focusing position of a finder optical system, sets, as an actual focusing position switching point, a point further on an infinite side than an original focusing position switching point when moving the finder optical system from a closest range to the infinite side and a point further on a closest range side than the original focusing position switching point when moving the finder optical system from the infinite side to the closest range. In the imaging device according to Japanese Patent Application Laid-Open No. H11-142721, so-called hysteresis is provided between an original focus switching point and an actual focus switching point. Consequently, frequent switching (hunting) of the focusing position of the finder optical system is prevented.

SUMMARY OF THE INVENTION

However, the invention described in Japanese Patent Application Laid-Open No. H11-142721 copes with focusing and cannot solve a problem due to a change in an angle of view during zooming. Since zooming involves a change in an angle of view, a user feels more annoyed than during focusing.

The invention described in Japanese Patent Application Laid-Open No. H11-142721 does not take into account timing for adjusting the finder optical system. Therefore, when an object distance change of a degree exceeding hysteresis continuously occurs, for example, an object to be imaged by a camera is changed, there is a problem in that frequent switching occurs in an optical finder.

The presently disclosed subject matter has been devised in view of such circumstances and it is an object of the presently disclosed subject matter to provide an imaging device including a user-friendly variable magnification optical finder that is suppressed from being frequently switched while following a zoom operation of a camera, an imaging method, a program for controlling processing of the imaging device, and a recording medium having the program stored therein.

In order to attain the object, an imaging device according to an aspect of the presently disclosed subject matter includes: an imaging unit configured to acquire a taken image obtained by imaging object light passed through an imaging optical system; a zooming unit configured to continuously change a magnification of the taken image; an optical finder configured to observe an object image via an optical system different from the imaging optical system; and a magnification varying unit configured to switch a finder magnification, which is a magnification of an optical finder, from a first finder magnification to a second finder magnification when the magnification of the taken image is changed to a first imaging magnification in an increasing direction and switching the finder magnification from the second finder magnification to the first finder magnification when the magnification of the taken image is changed to a second imaging magnification smaller than the first imaging magnification in a decreasing direction.

With the imaging device according to the aspect of the presently disclosed subject matter, when the magnification of the taken image is changed by the zooming unit, the finder magnification, which is the magnification of the optical finder, is changed stepwise. The finder magnification is switched from the first finder magnification to the second finder magnification when the magnification of the taken image is changed to the first imaging magnification in the increasing direction. On the other hand, the finder magnification is switched from the second finder magnification to the first finder magnification when the magnification of the taken image is changed to the second imaging magnification smaller than the first imaging magnification in the decreasing direction. Consequently, when a user is determining an angle of view while moving a zoom little by little, the optical finder is not switched many times and the user does not feel annoyed. Therefore, the user can perform adjustment of the angle of view without feeling stress. Note that the imaging magnification may be changed by changing a focal length of the imaging optical system. The imaging magnification may be changed by extracting a part of the taken image and enlarging the part of the taken image as in an electronic zoom. It is also possible to change the imaging magnification to a certain magnification by changing the focal length and, when changing the imaging magnification to a magnification equal to or higher than the certain magnification, change the imaging magnification by extracting a part of the taken image.

The imaging device according to another aspect of the presently disclosed subject matter may further include: a display unit configured to display an image indicating an imaging angle of view of the taken image; and an image superimposing unit configured to superimpose the image displayed by the display unit on an object image observed by the optical finder to display the image. Note that, as the image indicating the imaging angle of view, a frame of a size of the imaging angle of view, marks displayed at four corners of the imaging angle of view, masking on the outer side of the imaging angle of view, and the like are conceivable. Consequently, the user can easily adjust the imaging angle of view.

In the imaging device according to another aspect of the presently disclosed subject matter, the display unit may further display a mark indicating the imaging angle of view at which the finder magnification is changed. Consequently, the user can learn to which degree zooming is performed to switch the finder magnification. Therefore, it is possible to reduce annoyance caused by the switching of the finder magnification.

The imaging device according to another aspect of the presently disclosed subject matter may further include a determining unit configured to determine whether the magnification of the taken image is not changed for a predetermined time after the magnification of the taken image is changed to the first imaging magnification or the second imaging magnification by the zooming unit. The magnification varying unit may change the finder magnification when the determining unit determines that the magnification of the taken image is not changed for the predetermined time. Consequently, it is possible to always fix the magnification of the optical finder during the zooming. Therefore, it is possible to further reduce the annoyance of the user. It is possible to allow the user to easily adjust the imaging angle of view.

In the imaging device according to another aspect of the presently disclosed subject matter, the magnification varying unit may change the finder magnification to a minimum magnification while the magnification of the taken image is being changed. Consequently, a finder angle of view is always not smaller than a proper bright frame size. It is possible to check the imaging angle of view in all zoom positions.

The imaging device according to another aspect of the presently disclosed subject matter may further include a change amount detecting unit configured to detect a change amount of the magnification of the taken image when the magnification of the taken image is changed. When the change amount of the magnification of the taken image is equal to or smaller than a predetermined value, the magnification varying unit may change the finder magnification when the determining unit determines that the predetermined time has elapsed. Consequently, when the user performs delicate angle of view adjustment while performing the zooming, it is possible to make it easy to perform the adjustment of an angle of view by not switching the finder magnification during zoom driving.

The imaging device according to another aspect of the presently disclosed subject matter may further include a predetermined time changing unit configured to change the predetermined time according to the change amount detected by the change amount detecting unit. Consequently, it is possible to change a standby time according to speed of zoom movement.

In the imaging device according to another aspect of the presently disclosed subject matter, the predetermined time changing unit may change the predetermined time to be shorter as the change amount is larger. Consequently, when the zooming is performed all at once, it is possible to enable the user to quickly switch the finder magnification. When the zooming is performed all at once, it is possible to enable the user to immediately shift to delicate angle of view adjustment after the zooming.

An imaging method according to another aspect of the presently disclosed subject matter includes: a step of acquiring a taken image obtained by imaging object light passed through an imaging optical system; a step of changing a magnification of the taken image; and a step of changing a finder magnification, which is a magnification of a finder optical system different from the imaging optical system, according to the magnification of the taken image, switching the finder magnification from a first finder magnification to a second finder magnification when the magnification of the taken image is changed to a first imaging magnification in an increasing direction and switching the finder magnification from the second finder magnification to the first finder magnification when the magnification of the taken image is changed to a second imaging magnification smaller than the first imaging magnification in a decreasing direction.

A program according to another aspect of the presently disclosed subject matter causes an arithmetic unit to execute: a step of acquiring a taken image obtained by imaging object light passed through an imaging optical system; a step of changing a magnification of the taken image; and a step of changing a finder magnification, which is a magnification of a finder optical system different from the imaging optical system, according to the magnification of the taken image, switching the finder magnification from a first finder magnification to a second finder magnification when the magnification of the taken image is changed to a first imaging magnification in an increasing direction and switching the finder magnification from the second finder magnification to the first finder magnification when the magnification of the taken image is changed to a second imaging magnification smaller than the first imaging magnification in a decreasing direction.

According to the presently disclosed subject matter, it is possible to provide an imaging device including a user-friendly variable magnification optical finder that is suppressed from being frequently switched while following a zoom operation of a camera, an imaging method, a program for controlling processing of the imaging device, and a recording medium having the program stored therein.

BRIEF DESCRIPTION OF THE DRAWINGS

FIG. 3 is a diagram illustrating a relation between a focal length and a finder magnification;

FIG. 7 is a diagram illustrating an image of display of a finder;

DETAILED DESCRIPTION OF EXEMPLARY EMBODIMENTS

Embodiments of an imaging device according to the presently disclosed subject matter are explained in detail below with reference to the accompanying drawings.

<First Embodiment>

[Explanation of the Configuration of an Imaging Device]

Figure 1:
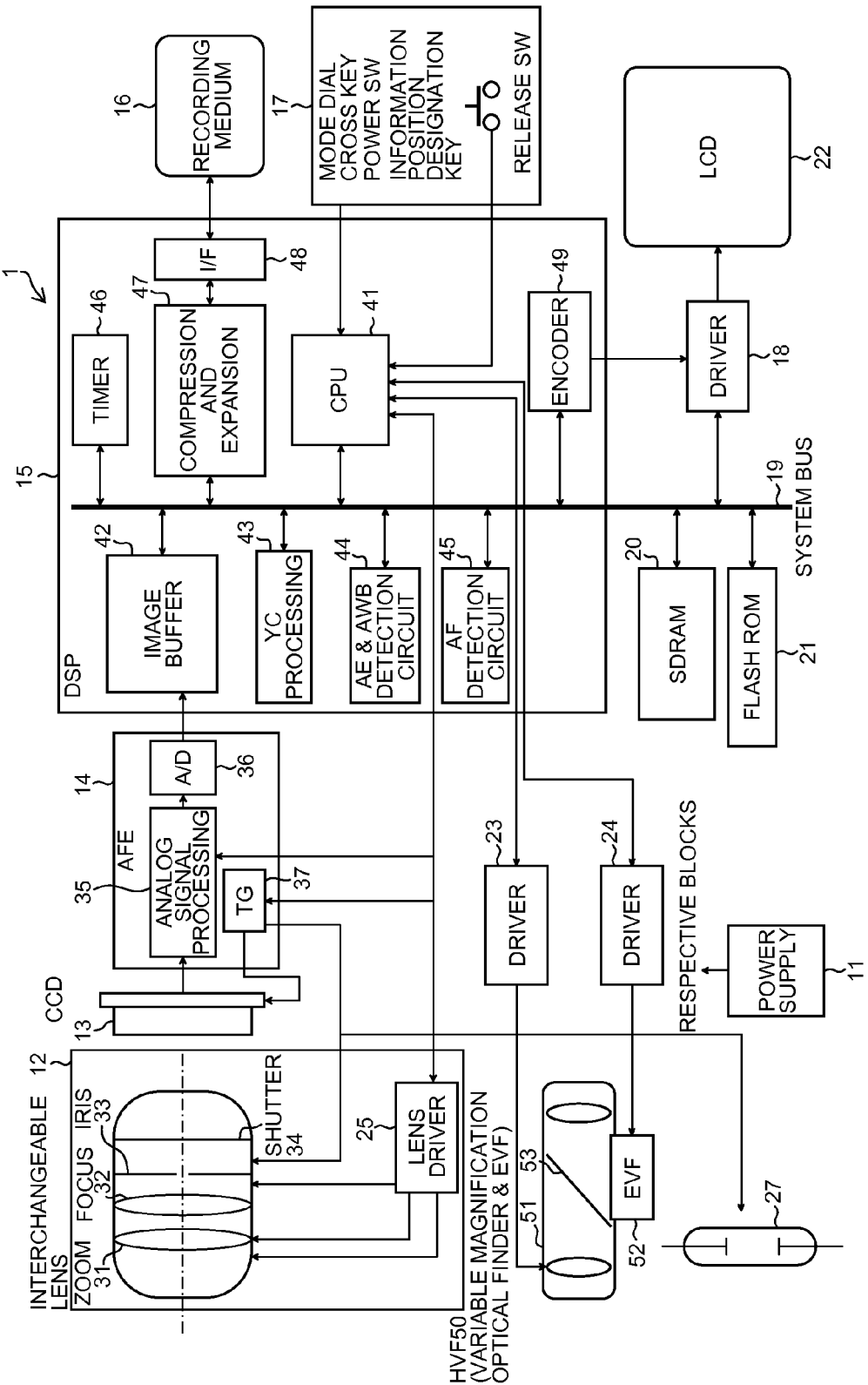
FIG. 1 is a block diagram of an imaging device.

FIG. 1 is a block diagram illustrating an example of an internal configuration of a digital camera 1. The digital camera 1 receives, with an imaging element, light passed through a lens, converts the light into a digital signal, and records the digital signal in a storage medium. The operation of the entire digital camera 1 is collectively controlled by a central processing unit (CPU) 41.

As illustrated in FIG. 1, the digital camera 1 includes a power supply 11, an imaging optical system 12, an imaging element 13, an AFE (Analog Front End) 14, a DSP (Digital Signal Processor) 15, a recording medium 16, an operation section 17, a display driver 18, a system bus 19, an SDRAM (Synchronous Dynamic Random Access Memory) 20, a flash ROM (Read-Only Memory) 21, a flash light emitting section 27, and a display section (e.g., an LCD (Liquid Crystal Display)) 22. Further, the digital camera 1 includes a lens driver 25 for driving the imaging optical system 12 and drivers (23 and 24, respectively) for driving an optical finder 51 and an electronic view finder 52. The lens driver 25 and the drivers 23 and 24 are connected to serial input and output (I/O) terminals of the DSP 15.

The power supply 11 includes a battery and a power supply control section not illustrated in the figure and performs power supply to the respective blocks of the digital camera 1. The respective blocks supplied with electric power are controlled by the CPU 41 included in the DSP 15 to operate. The CPU 41 executes a predetermined control program on the basis of an input from the operation section 17 and controls the respective sections of the digital camera 1.

The operation section 17 includes a release switch, a mode dial, a cross key, a reproduction button, a MENU/OK key, and a BACK key. A signal from the operation section 17 is input to the CPU 41. The CPU 41 controls respective circuits of the digital camera 1 on the basis of the input signal and performs, for example, lens driving control, aperture driving control, imaging operation control, image processing control, recording/reproduction control for image data, and display control for the LCD 22 capable of performing stereoscopic display.

The release switch is an operation button for inputting an instruction for an imaging start and is configured by a switch of a two-stage stroke type including an S1 switch that is turned on when half-pressed and an S2 switch that is turned on when full-pressed. The mode dial is selecting means for selecting a 2D imaging mode, a 3D imaging mode, an auto imaging mode, a manual imaging mode, scene positions for a person, a landscape, a night view, and the like, a macro mode, a moving image mode, and a parallax preference imaging mode.

The reproduction button is a button for switching to a reproduction mode for causing the LCD 22 to display a taken and recorded still image or moving image of a stereoscopic image (3D image) or a plane image (2D image). The MENU/OK key is an operation key including both of a function of a menu button for performing a command for causing the LCD 22 to display a menu on a screen of the LCD 22 and a function of an OK button for commanding decision, execution, and the like of selected content. The cross key is an operation section for inputting indication of up, down, left, and right four directions and functions as a button (cursor moving operation means) for selecting an item from a menu screen and instructing selection of various setting items from respective menus. Up/down keys of the cross key function as a zoom switch during imaging or a reproduction zoom switch during the reproduction mode. Left/right keys function as a frame advance (forward/backward advance) button during the reproduction mode. The BACK key is used for erasing of a desired target such as a selected item and cancellation of instruction content or, for example, when an operation state is returned to the immediately preceding operation state.

In the flash ROM 21, the control program executed by the CPU 41, various parameters necessary for control, pixel defect data of the imaging element (the CCD (Charge Coupled Device)) 13, and the like are recorded. The CPU 41 reads out the control program recorded in the flash ROM 21 to the SDRAM 20 and successively executes the control program to control the respective sections of the digital camera 1. Note that the SDRAM 20 is used as an execution processing area for a program. The SDRAM 20 is used as a temporary storage area for image data and the like and various work areas.

The imaging optical system 12 includes a zoom lens 31, a focus lens 32, an iris 33, and a shutter 34. The zoom lens 31, the focus lens 32, the iris 33, and the shutter 34 are respectively driven by the lens driver 25 on the basis of commands of the CPU 41.

The zoom lens 31 and the focus lens 32 move back and forth on the same optical axis and perform zooming and focusing.

The iris 33 controls an amount of light made incident on the CCD 13 and performs control of shutter speed and exposure. The iris 33 consists of, for example, five diaphragm blades and is subjected to diaphragm control in six stages from an aperture value F1.4 to an aperture value F11 at an interval of 1 AV. The shutter 34 operates to make object light passed through the zoom lens 31, the focus lens 32, and the iris 33 incident on the CCD 13 for a predetermined time.

The CCD 13 is arranged in a post stage of the shutter 34 and receives object light passed through the imaging optical system 12. The CCD 13 includes a light receiving surface on which a large number of light receiving elements are arrayed in a matrix shape as it is well known. The object light passed through the imaging optical system 12 is imaged on the light receiving surface of the CCD 13 and converted into an electric signal by the respective light receiving elements. Note that a type of the imaging element is not limited to the CCD. As the imaging element, other image sensors such as a CMOS (Complementary Metal Oxide Semiconductor) are also applicable.

The AFE 14 includes an analog signal processing section 35, an A/D converter 36, and a timing generator (TG) 37. The CCD 13 outputs charges accumulated in respective pixels line by line as a serial image signal in synchronization with a vertical transfer clock and a horizontal transfer clock supplied from the timing generator 37. The CPU 41 controls the timing generator 37 and controls the driving of the CCD 13.

Note that a charge accumulation time (an exposure time) of the pixels is determined by an electronic shutter driving signal given from the timing generator 37. The CPU 41 instructs the timing generator 37 about the charge accumulation time.

The output of the image signal is started when the digital camera 1 is set in an imaging mode. That is, when the digital camera 1 is set in the imaging mode, in order to display a live view image (a through image) on the LCD 22, the output of the image signal is started. The output of the image signal for the through image is once stopped when an instruction for main imaging is performed. The output of the image signal for the through image is started again when the main imaging ends.

The image signal output from the CCD 13 is an analog signal. The analog image signal is captured into the analog signal processing section 35.

The analog signal processing section 35 includes a correlated double sampling circuit (CDS) and an automatic gain control circuit (AGC). The CDS performs removal of noise included in the image signal. The AGC amplifies the image signal subjected to the noise removal with a predetermined gain. The analog image signal subjected to required signal processing by the analog signal processing section 35 is captured into the A/D converter 36.

The A/D converter 36 converts the captured analog image signal into a digital image signal having gradation width of predetermined bits. The image signal is so-called RAW data and has gradation values indicating concentrations of R (red), G (green), and B (blue) for each of pixels. The digital image signal is captured into the DSP 15.

The DSP 15 includes the CPU 41 explained above, an image buffer 42, a YC processing section 43, an AE/AWB detection circuit 44, an AF detection circuit 45, a timer 46, a compressing and expanding section 47, a recording medium interface (I/F) 48, and a video encoder 49. These are connected to a system bus 19 and can transmit and receive information to one another via the system bus 19.

The image buffer 42 stores image signals for one frame captured from the A/D converter 36.

The AF detection circuit 45 captures image signals of R, G, and B stored in the image buffer 42 and calculates a focus evaluation value necessary for AF (Automatic Focus) control according to a command of the CPU 41. The AF detection circuit 45 includes a high-pass filter configured to allow only a high-frequency component of a G signal to pass, an absolute value processing section, an AF area extracting section configured to slice out a signal in a predetermined focus area (hereinafter referred to as AF area) set on a screen, and an integrating section configured to integrate absolute value data in the AF area. The AF detection circuit 45 outputs the absolute value data in the AF area integrated by the integrating section to the CPU 41 as a focus evaluation value. As a control system for a focus lens group based on the focus evaluation value, it is possible to use a system for searching for a position where the focus evaluation value is maximal and moving the focus lens 32 to the position and a mountain climbing system for moving the focus lens group in a direction in which the focus evaluation value increases and, when a point where the focus evaluation value starts to decrease is detected, setting the focus lens group in the position.

The AE/AWB detection circuit 44 captures the image signals of R, G, and B stored in the image buffer 42, integrates the G signal of the entire screen or integrates the G signal weighted differently in a screen center portion and a peripheral portion, and outputs an integrated value necessary for AE control of the G signal to the CPU 41. The CPU 41 calculates a luminance value from the integrated value and calculates an exposure value from the luminance value. The CPU 41 determines an aperture value and shutter speed from the exposure value according to a predetermined program diagram.

The AE/AWB detection circuit 44 divides one screen into a plurality of areas (e.g., 16×16) and calculates average integrated values by colors of the image signals of R, G, and B for each of the divided areas as physical quantities necessary for AWB control. The CPU 41 calculates ratios of R/G and B/G for each of the divided areas from the obtained integrated value of R, integrated value of B, and integrated value of G and performs light source type discrimination on the basis of, for example, distribution in a color space of R/G and B/G of calculated values of R/G and B/G. The CPU 41 determines gain values (white balance correction values) for R, G, and B signals of a white balance adjustment circuit according to a white balance adjustment value suitable for the discriminated light source type such that, for example, values of the ratios are about 1 (i.e., an integration ratio of RGB is R:G:B=1:1:1 on one screen). The AE/AWB detection circuit 44 applies a digital gain corresponding to the light source type to the image signals for one frame stored in the image buffer 42 to perform white balance adjustment and perform gamma (gradation characteristic) processing and sharpness processing.

The YC processing section 43 applies predetermined signal processing to the image signals of the respective colors of R, G, and B captured in a point sequential manner and generates an image signal (a Y/C signal) including a luminance signal Y and color difference signals Cr and Cb. The Y/C signal is stored in the SDRAM 20.

The compressing and expanding section 47 applies compression processing of a predetermined format (e.g., JPEG (Joint Photographic Experts Group)) to the input Y/C signal according to a compression command from the CPU 41 and generates compressed image data. The compressing and expanding section 47 applies expansion processing of a predetermined format to the input compressed image data according to an expansion command from the CPU 41 and generates uncompressed image data.

The video encoder 49 controls display on the LCD 22 via the display driver 18 according to a command from the CPU 41.

The LCD 22 can display a moving image (a through image) and use the moving image as an electronic view finder. The LCD 22 can also display a taken image before recording (a preview image), a reproduced image read out from the recording medium 16 inserted in the digital camera 1, and the like. The LCD 22 displays, according to operation of the mode dial or the menu button, various menu screens in manually setting an operation mode of the digital camera 1, white balance, the number of pixels of an image, and sensitivity and displays a screen for a graphical user interface (GUI) capable of setting manual setting items according to the operation of the operation section 17.

The recording medium interface 48 controls reading of data from and writing of data in the recording medium 16 according to a command from the CPU 41. Note that the recording medium 16 may be a recording medium detachably attached to a camera main body like a memory card or may be a recording medium incorporated in the camera main body. When it is detachably attached, a card slot is provided in the main body of the digital camera 1, and it is inserted into the card slot and used.

The timer 46 performs measurement of a timer time in a self timer mode.

A finder (HVF) 50 includes the optical finder 51, the electronic view finder (EVF) 52, and a prism 53. The user can visually recognize an optical image of the optical finder 51 and an electronic image of the electronic view finder 52 via one eyepiece section.

The optical finder 51 is a variable magnification optical finder capable of changing a magnification stepwise according to magnification variation of the imaging optical system 12. The optical finder 51 includes a finder optical system including an objective lens, an eyepiece, and two insertion lenses provided therebetween and disposed to be capable of advancing into and retracting from an optical path of the optical finder 51. When one insertion lens is inserted into the optical path according to an instruction of the CPU 41, the magnification of the optical finder 51 (hereinafter referred to as finder magnification) is changed from ×1 to ×2. Further, when one more insertion lens is inserted into the optical path, the finder magnification is changed from ×2 to ×3. Note that the configuration of the lenses included in the optical finder 51 and a form of magnification control are not limited to the above.

The electronic view finder 52 includes a display section (e.g., a liquid crystal panel). Display of the electronic view finder 52 is guided to the eyepiece section of the optical finder 51 by the prism 53 disposed in the optical path of the optical finder 51.

[Explanation of the Operation of the Imaging Device]

Next, the operation of the digital camera 1 is explained. This imaging processing is controlled by the CPU 41. A program for causing the CPU 41 to execute the imaging processing is stored in, for example, a program storing section in the CPU 41.

Object light passed through the respective lenses 31 and 32 of the imaging optical system 12 is imaged on the light receiving surface of the CCD 13 via the iris 33. Signal charges accumulated in the respective pixels of the CCD 13 are sequentially read out at a predetermined frame rate as a voltage signal (an image signal) corresponding to the signal charges according to horizontal and vertical transfer clocks received from the timing generator 37. Image data is sequentially generated. The generated image data is sequentially input to the SDRAM 20.

The CPU 41 changes an opening amount (an F value) of the iris 33 on the basis of the image data. The CPU 41 moves the zoom lens 31 along an optical axis via the lens driver 25 and performs zooming according to an input from the operation section 17.

Figure 2A:
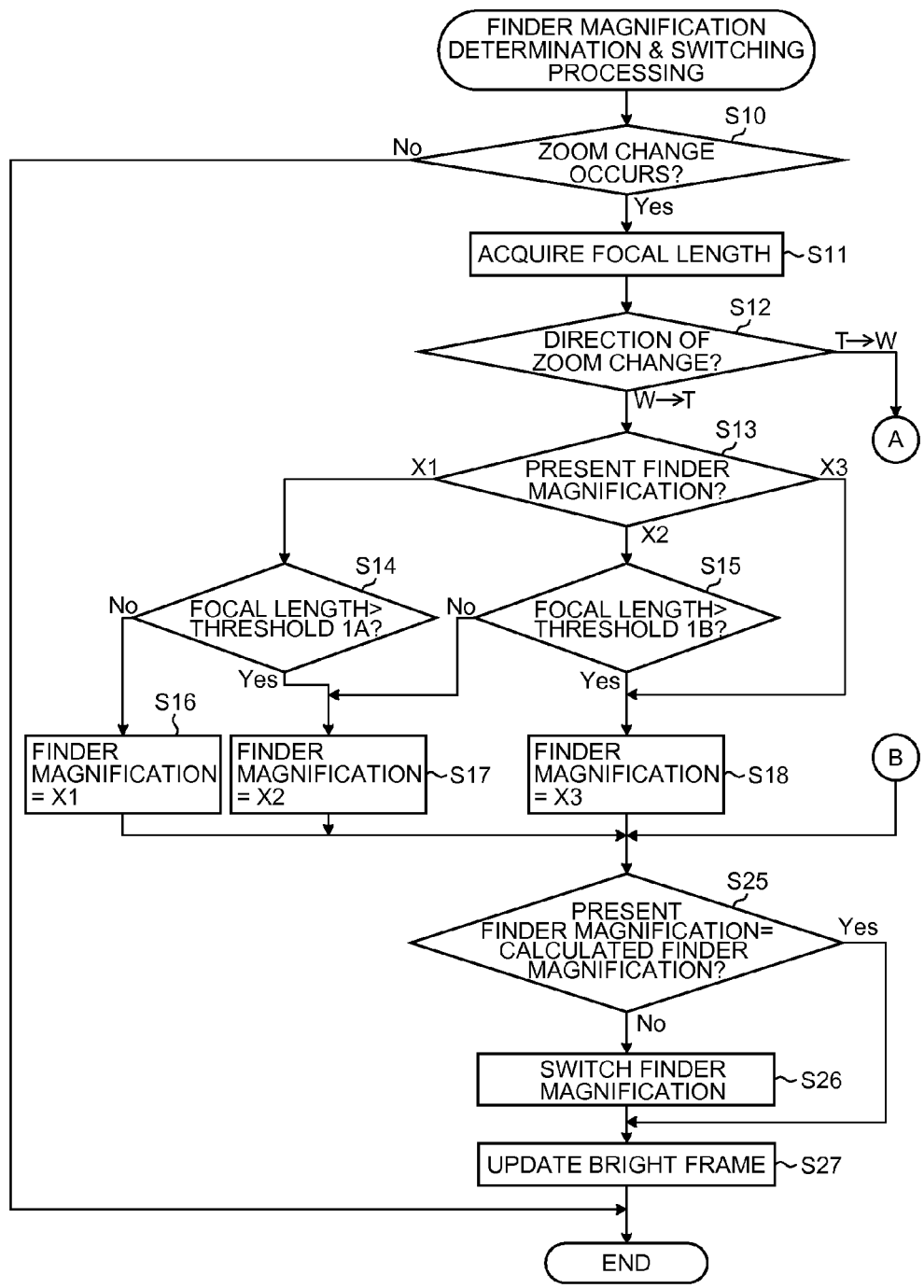
FIG. 2A is a flowchart illustrating a flow of finder magnification switching processing in a first embodiment.
Figure 2B:
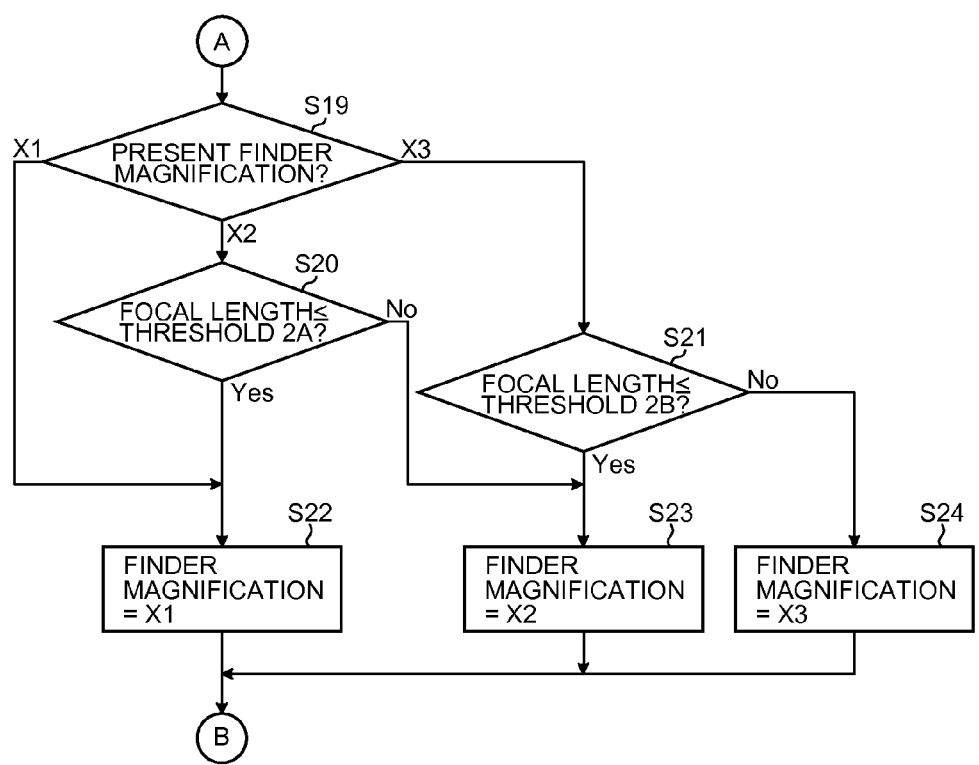
FIG. 2B is a flowchart (continued) illustrating the flow of the finder magnification switching processing in the first embodiment.

FIGS. 2A and 2B are flowcharts illustrating a flow of processing for adjusting a finder magnification. The processing is mainly performed by the CPU 41. The processing is repeatedly carried out at timing (e.g., in units of several ten milliseconds) of periodical detection of the position of the zoom lens 31.

The CPU 41 determines whether the position of the zoom lens 31 (hereinafter referred to as zoom position), that is, a focal length changes (step S10). When the zoom position does not change (NO in step S10), the CPU 41 ends the processing. When the zoom position changes (YES in step S10), the CPU 41 acquires the focal length from the position of the zoom lens 31 (step S11).

The CPU 41 determines in which direction the zoom lens 31 moves (i.e., whether the zoom lens 31 moves from a wide side to a tele-side (from a low magnification side to a high magnification side) or moves from the tele-side to the wide side (from the high magnification side to the low magnification side)) (step S12). This embodiment has a characteristic that the magnification of the optical finder 51 (hereinafter referred to as finder magnification) is changed when the zoom lens 31 moves from the wide side to the tele-side and when the zoom lens 31 moves from the tele-side to the wide side. Therefore, it is important to acquire not only the focal length but also a direction of a change of the zoom lens 31.

First, processing performed when the zoom lens 31 moves from the wide side to the tele-side is explained. The CPU 41 acquires the present finder magnification (step S13).

When the finder magnification is ×1 (×1 in step S13), the CPU 41 determines whether the focal length acquired in step S12 is larger than a threshold 1A in a finder magnification switching diagram illustrated in FIG. 3 (step S14). When the focal length is equal to or smaller than the threshold 1A (NO in step S14), the CPU 41 sets the finder magnification to ×1 (step S16). When the focal length is larger than the threshold 1A (YES in step S14), the CPU 41 sets the finder magnification to ×2 (step S17).

When the finder magnification is ×2 (×2 in step S13), the CPU 41 determines whether the focal length acquired in step S12 is larger than a threshold 1B in the finder magnification switching diagram illustrated in FIG. 3 (step S15). When the focal length is equal to or smaller than the threshold 1B (NO in step S15), the CPU 41 sets the finder magnification to ×2 (step S17). When the focal length is larger than the threshold 1B (YES in step S15), the CPU 41 sets the finder magnification to ×3 (step S18).

When the finder magnification is ×3 (×3 in step S13), the CPU 41 sets the finder magnification to ×3 (step S18).

Next, processing performed when the zoom lens 31 moves from the tele-side to the wide side is explained. The CPU 41 acquires the present finder magnification (step S19).

When the finder magnification is ×1 (×1 in step S19), the finder magnification is not setd from ×1 (step S22).

When the finder magnification is ×2 (×2 in step S19), the CPU 41 determines whether the focal length acquired in step S12 is equal to or smaller than a threshold 2A in the finder magnification switching diagram illustrated in FIG. 3 (step S20). When the focal length is equal to or smaller than the threshold 2A (YES in step S20), the CPU 41 sets the finder magnification to ×1 (step S22). When the focal length is larger than the threshold 2A (NO in step S20), the CPU 41 sets the finder magnification to ×2 (step S23).

When the finder magnification is ×3 (×3 in step S19), the CPU 41 determines whether the focal length acquired in step S12 is equal to or smaller than a threshold 2B in the finder magnification switching diagram illustrated in FIG. 3 (step S21). When the focal length is equal to or smaller than the threshold 2B (YES in step S21), the CPU 41 sets the finder magnification to ×2 (step S23). When the focal length is larger than the threshold 2B (NO in step S21), the CPU 41 sets the finder magnification to ×3 (step S24).

The finder magnification switching diagram (see FIG. 3) is explained. In this embodiment, hysteresis is provided such that the finder magnification is not immediately switched even if a zoom position changes near the thresholds. That is, the thresholds 1A, 1B, 2A, and 2B for determination are set to satisfy a relation indicated by Expression 1.

Threshold 1A>threshold 2A

Threshold 1B>threshold 2B  [Expression 1]

The threshold 1A is further on the higher magnification side than the threshold 2A, and the threshold 1B is further on the higher magnification side than the threshold 2B. When such hysteresis is not provided, when a zoom position of the imaging optical system 12 continuously changes near switching positions of the finder magnification, so-called hunting occurs in which the finder magnification is switched every time the zoom position changes. Therefore, since the magnification of an object visually recognized by the user via the optical finder 51 is frequently changed, the user tends to feel discomfort. On the other hand, when the hysteresis illustrated in FIG. 3 is provided, hunting does not occur. The user looking through the optical finder 51 can perform adjustment of an angle of view without feeling stress.

Referring back to FIG. 2, the CPU 41 determines whether the present finder magnification acquired in step S13 or S19 and the finder magnification determined in steps S16 to S18 or steps S22 to S24 are equal to each other (step S25). When they are equal to each other (YES in step S25), the CPU 41 proceeds to step S27. When they are different (NO in step S25), the CPU 41 inserts or removes the insertion lenses via the driver 23 and changes the present finder magnification to the finder magnification determined in steps S16 to S18 or steps S22 to S24 (step S26).

After the finder magnification is switched (step S26) or when the present finder magnification and the determined finder magnification are the same (YES in step S25), the CPU 41 displays a bright frame F on the electronic view finder 52 on the basis of the focal length acquired in step S11 and the finder magnification switched in step S26 (step S27). The zoom lens 31 is capable of performing stepless magnification variation. However, the optical finder 51 is capable of switching a magnification stepwise (or the number of stages of magnification variation of the zoom lens 31 is larger than the number of stages of switching of the magnification of the optical finder 51). Therefore, a range of an object visually recognizable via the optical finder 51 and an imaging area (an effective imaging angle of view) actually imaged using the imaging optical system 12 are sometimes different. Therefore, the CPU 41 causes the electronic view finder 52 to display the bright frame F indicating the imaging area.

Figure 4:
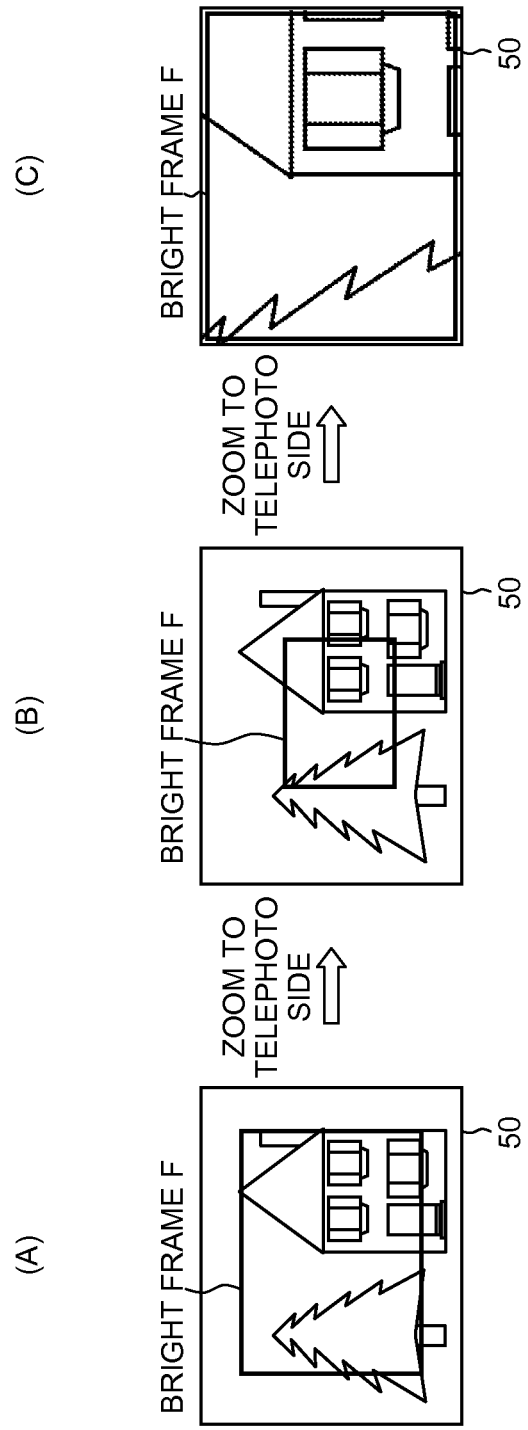
FIG. 4 is a diagram illustrating an image of display of a finder.

FIG. 4 is a diagram illustrating an image of display of the finder 50 in the digital camera 1. The bright frame F is displayed to overlap an optical image of the optical finder 51. The size of the bright frame F is calculated from a difference between focal lengths (e.g., focal lengths in terms of 35 mm size) of the optical finder 51 and the zoom lens 31. The position of the bright frame F is calculated on the basis of an object distance calculated from a focus position in an AF operation performed after an S1 ON signal is input in the last imaging. However, when information concerning a focus position obtained in the last imaging, for example, immediately after turning on a power supply is absent, the position of the bright frame F is determined on the basis of an object distance calculated from an initially set focus position.

When a zoom magnification of the imaging optical system 12 changes from a state illustrated in an (A) portion of FIG. 4, since an imaging angle of view changes, the size of the bright frame F changes as illustrated in a (B) portion of FIG. 4. However, when the bright frame F further decreases in size, deviation between an angle of view of the optical finder 51 and an actual imaging angle of view (the bright frame F) increases and it is hard to perform imaging. Therefore, when the focal length exceeds a predetermined threshold as illustrated in a (C) portion of FIG. 4, the magnification of the optical finder 51 is switched in a range in which the bright frame F is within a finder angle of view. When the magnification of the optical finder 51 is switched, the size of the bright frame F is also switched. Note that the thresholds 1A, 1B, 2A, and 2B illustrated in FIG. 3 are determined such that the size of the bright frame F is basically equal to or smaller than the angle of view of the optical finder 51.

Note that the display of the bright frame F may be performed immediately after the start of imaging of a through image (before the start of the processing for adjusting the finder magnification illustrated in FIG. 2). Consequently, it is possible to recognize a difference between an angle of view recognized by the optical finder 51 before zooming processing and the imaging angle of view. When the bright frame F is not displayed immediately after the start of imaging of the through image, the CPU 41 may control the imaging optical system 12 and the optical finder 51 such that the imaging angle of view coincides with a finder magnification.

Figure 5:
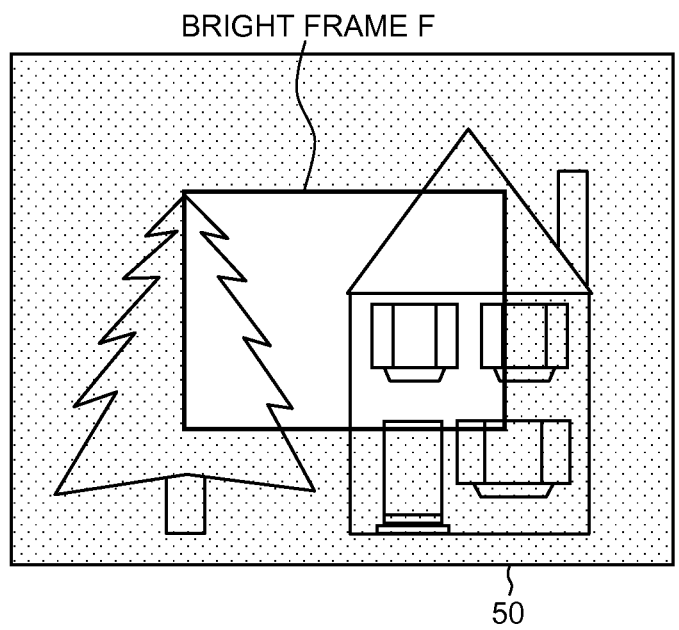
FIG. 5 is a diagram illustrating an image of display of the finder.

Note that the imaging angle of view is not limited to the imaging angle of view indicated by the bright frame F. For example, marks may be displayed at four corners of an imaging region illustrating the imaging angle of view. Further, in order to allow the user to easily recognize the imaging region, as illustrated in FIG. 5, the CPU 41 may mask the outer side of the bright frame F of the electronic view finder 52 and display the outer side in translucent gray. Consequently, it is possible to more clearly show the imaging angle of view.

Consequently, the processing for adjusting the finder magnification illustrated in FIG. 2 is finished. Note that the processing for adjusting the finder magnification does not end even if the processing ends once. The processing is repeatedly performed at a predetermined interval until the S1 ON signal is input.

When the release switch is half-pressed, the S1 ON signal is input to the CPU 41. The CPU 41 carries out AE/AF/AWB operations via the AF detection circuit 45 and the AE/AWB detection circuit 44. Note that, when contrast AF for searching for a position where the focus evaluation value is maximal is performed, an object distance is acquired by the AF detection circuit 45 for the first time in this stage. Therefore, the CPU 41 calculates the position of the bright frame F from the object distance and finely adjusts the bright frame F to a position calculated taking into account a parallax. When the object distance is short (about 3 m), since there is the parallax, the bright frame F moves before and after S1. On the other hand, when the object distance is long, since the influence of the parallax is small, the bright frame F hardly moves.

Thereafter, when the release switch is fully pressed, an S2 ON signal is input to the CPU 41, and the CPU 41 starts imaging and recording processing. That is, the CPU 41 exposes the CCD 13 at shutter speed and an aperture value determined on the basis of a photometry result.

Image data output from the CCD 13 is captured into the YC processing section 43 via the AFE 14 and converted into a luminance/color difference signal (a Y/C signal). The image data is stored in the SDRAM 20 after being compressed according to a predetermined compression format (e.g., a JPEG format) by the compressing and expanding section 47.

An image file is generated from the compressed data stored in the SDRAM 20. The image file is recorded in the recording medium 16 via the recording medium interface 48. Consequently, an image is taken and recorded.

The image recorded in the recording medium 16 as explained above can be reproduced and displayed on the LCD 22 by setting the operation mode of the digital camera 1 to the reproduction mode with the reproduction button.

When the operation mode is set to the reproduction mode, the CPU 41 reads out, via the recording medium interface 48, an image file recorded last in the recording medium 16.

Compressed image data of the read-out image file is added to the compressing and expanding section 47 and output to the LCD 22 via the video encoder 49 after being expanded to an uncompressed luminance/color difference signal.

Frame advance of an image is performed by the left and right key operation of the cross key. When the right key of the cross key is pressed, the next image file is read out from the recording medium 16 and reproduced and displayed on the LCD 22. When the left key of the cross key is pressed, the immediately preceding image file is read out from the recording medium 16 and reproduced and displayed on the LCD 22.

According to this embodiment, when the user is determining an angle of view while moving a zoom little by little, the finder magnification of the optical finder 51 is not switched many times and the user does not feel annoyed. Therefore, the user can perform adjustment of the angle of view without feeling stress.

Note that, in this embodiment, the digital camera in which the imaging optical system 12 is replaceable is explained as an example. However, the embodiments of the presently disclosed subject matter are not limited to this. The presently disclosed subject matter is also applicable to a digital camera of a lens integral type including a variable magnification optical finder.

In this embodiment, although the angle of view adjustment by the optical zoom for moving the zoom lens 31 is explained as an example, a zooming unit is not limited to the optical zoom. For example, the presently disclosed subject matter is also applicable to an imaging device that uses electronic zoom for slicing out a part of an image formed on the CCD 13 and changing an imaging magnification. The presently disclosed subject matter can also be applied to an imaging device that uses the electronic zoom after the zoom lens 31 is moved to a tele-end by the optical zoom. In this embodiment, the switching of the finder magnification is performed in the three stages but is not limited to the three stages.

Note that, in this embodiment, the bright frame F is displayed on the electronic view finder 52 and displayed to be superimposed on the optical image. However, the display of the bright frame F is not essential. In this case, the presently disclosed subject matter is also applicable to an optical finder (on which the electronic view finder is not displayed to be superimposed). In this embodiment, the bright frame F is displayed on the electronic view finder 52. However, means for displaying the bright frame F is not limited to the electronic view finder 52 as long as the means is capable of displaying the bright frame F to be superimposed on the optical finder 51. For example, it is also possible to dispose a liquid crystal monitor in the optical axis of the optical finder 51 and display a frame on the liquid crystal monitor.

<Second Embodiment>

The first embodiment of the presently disclosed subject matter is a form for causing the electronic view finder 52 to display the bright frame F indicating the imaging area. However, a display form of the bright frame F is not limited to this.

A second embodiment of the presently disclosed subject matter is a form for displaying the bright frame F and a finder magnification switching assist as a finder. A digital camera 1-1 according to the second embodiment is explained below. Explanation is omitted concerning portions same as the portions in the first embodiment.

Figure 6A:
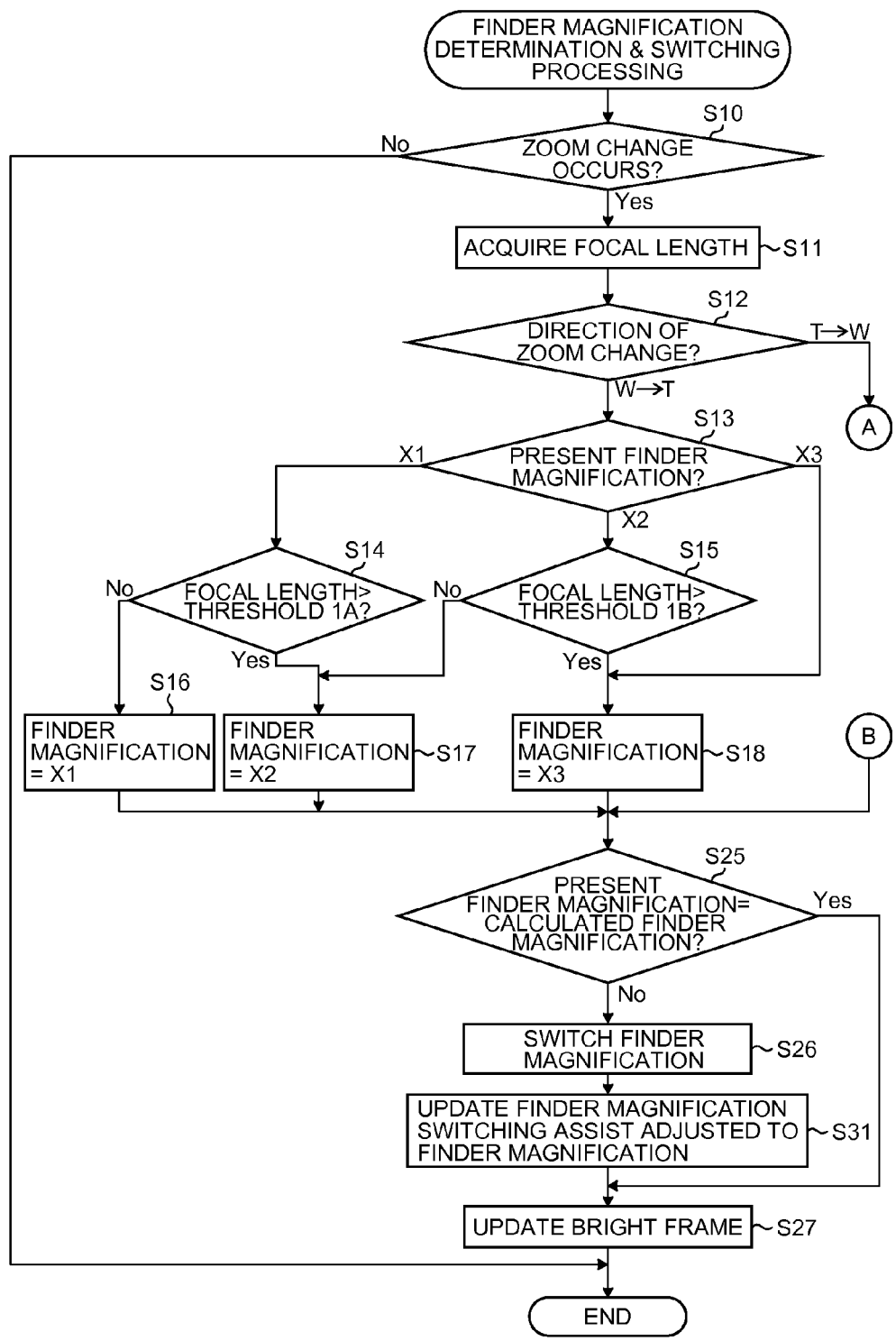
FIG. 6A is a flowchart illustrating a flow of finder magnification switching processing in a second embodiment.
Figure 6B:
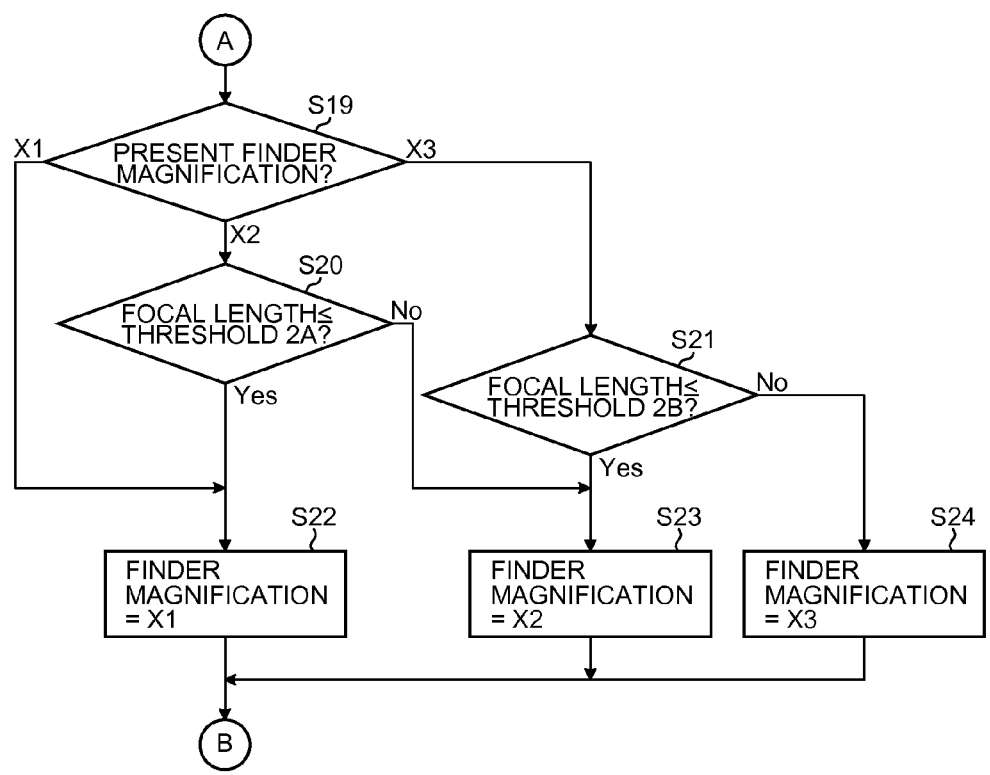
FIG. 6B is a flowchart (continued) illustrating the flow of the finder magnification switching processing in the second embodiment.

FIG. 6A and FIG. 6B are flowcharts illustrating a flow of processing for adjusting a finder magnification. The processing is mainly performed by the CPU 41. The processing is repeatedly carried out at timing (e.g., in units of several ten milliseconds) of periodical detection of the position of the zoom lens 31.

The CPU 41 determines whether a zoom position changes (step S10). When the zoom position does not change (NO in step S10), the CPU 41 ends the processing. When the zoom position changes (YES in step S10), the CPU 41 acquires a focal length from the position of the zoom lens 31 (step S11).

The CPU 41 determines in which direction the zoom lens 31 moves (step S12).

When the zoom lens 31 moves from the wide side to the tele-side, first, the CPU 41 acquires the present finder magnification (step S13). When the finder magnification is ×1 (×1 in step S13), the CPU 41 determines whether the focal length acquired in step S12 is larger than the threshold 1A (step S14). When the focal length is equal to or smaller than the threshold 1A (NO in step S14), the CPU 41 sets the finder magnification to ×1 (step S16). When the focal length is larger than the threshold 1A (YES in step S14), the CPU 41 sets the finder magnification to ×2 (step S17).

When the finder magnification is ×2 (×2 in step S13), the CPU 41 determines whether the focal length acquired in step S12 is larger than the threshold 1B (step S15). When the focal length is equal to or smaller than the threshold 1B (NO in step S15), the CPU 41 sets the finder magnification to ×2 (step S17). When the focal length is larger than the threshold 1B (YES in step S15), the CPU 41 sets the finder magnification to ×3 (step S18).

When the finder magnification is ×3 (×3 in step S13), the CPU 41 sets the finder magnification to ×3 (step S18).

When the zoom lens 31 moves from the tele-side to the wide side, first, the CPU 41 acquires the present finder magnification (step S19). When the finder magnification is ×1 (×1 in step S19), the finder magnification is not changed from ×1 (step S22).

When the finder magnification is ×2 (2 in step S19), the CPU 41 determines whether the focal length acquired in step S12 is equal to or smaller than the threshold 2A (step S20). When the focal length is equal to or smaller than the threshold 2A (YES in step S20), the CPU 41 sets the finder magnification to ×1 (step S22). When the focal length is larger than the threshold 2A (NO in step S20), the CPU 41 sets the finder magnification to ×2 (step S23).

When the finder magnification is ×3 (×3 in step S19), the CPU 41 determines whether the focal length acquired in step S12 is equal to or smaller than the threshold 2B (step S21). When the focal length is equal to or smaller than the threshold 2B (YES in step S21), the CPU 41 sets the finder magnification to ×2 (step S23). When the focal length is larger than the threshold 2B (NO in step S21), the CPU 41 sets the finder magnification to ×3 (step S24).

The CPU 41 determines whether the present finder magnification acquired in step S13 or S19 and the finder magnification determined in steps S16 to S18 or steps S22 to S24 are the same (step S25). When the finder magnifications are the same (YES in step S25), the CPU 41 proceeds to step S27. When the finder magnifications are different (NO in step S25), the CPU 41 inserts or removes the insertion lenses via the driver 23 and changes the present finder magnification to the finder magnification determined in steps S16 to S18 or steps S22 to S24 (step S26).

The CPU 41 displays a finder magnification switching assist on the electronic view finder 52 on the basis of the focal length acquired in step S11 and the finder magnification switched in step S26 (step S31). After the finder magnification switching assist is displayed (step S31) or when the present finder magnification and the determined finder magnification are the same (YES in step S25), the CPU 41 displays the bright frame F on the electronic view finder 52 on the basis of the focal length acquired in step S11 and the finder magnification switched in step S26 (step S27).

FIG. 7 is a diagram illustrating an image of display of the finder 50 in the digital camera 1-1. The finder magnification switching assist is display for informing a user in which degree of the size of the bright frame F (an imaging angle of view) a finder magnification is switched. A finder magnification switching assist A1 on a low magnification side is displayed on the outer side of the bright frame F. A finder magnification switching assist A2 on a high magnification side is displayed on the inner side of the bright frame F.

When the bright frame F increases in size to the finder magnification switching assist A1 on the low magnification side, the finder magnification is switched to a low side, for example, from a (D) portion to a (C) portion, from the (C) portion to a (B) portion, and from the (B) portion to an (A) portion of FIG. 7. When the bright frame F decreases in size to the finder magnification switching assist A2 on the high magnification side, the finder magnification is switched to a high side, for example, from the (A) portion to the (B) portion, from the (B) portion to the (C) portion, and from the (C) portion to the (D) portion of FIG. 7. Consequently, the user can learn in which degree of zoom the finder magnification is switched. Therefore, it is possible to reduce annoyance caused by the switching of the finder magnification.

Note that, in the finder magnification switching assist display, a color of a frame, the thickness of the frame, a line type of the frame, and the like can also be changed in the finder magnification switching assist A1 on the low magnification side and the finder magnification switching assist A2 on the high magnification side. Consequently, for the user, the assists A1 and A2 are clearly displayed. Because of the same reason, it is desirable to also change colors, thicknesses, line types, and the like of the bright frame F, the finder magnification switching assist A1 on the low magnification side, and the finder magnification switching assist A2 on the high magnification side.

Note that the finder magnification switching assist display may be performed before the start of the processing for adjusting the finder magnification illustrated in FIG. 6A and FIG. 6B. Consequently, the user can also learn, before the zooming processing, in which degree of zoom the finder magnification is switched.

According to this embodiment, when the zooming is performed or when the finder magnification is changed, it is possible to update the bright frame F and the finder magnification switching assist. Consequently, it is possible to reduce annoyance caused by the switching of the finder magnification.

Note that, in this embodiment, the bright frame F and the finder magnification switching assist are displayed on the electronic view finder 52. However, means for displaying the bright frame F and the finder magnification switching assist is not limited to the electronic view finder 52 as long as the means is capable of displaying the bright frame F and the finder magnification switching assist to be superimposed on the optical finder 51. For example, it is also possible to dispose a liquid crystal monitor in the optical axis of the optical finder 51 and display a frame on the liquid crystal monitor.

<Third Embodiment>

The first embodiment of the presently disclosed subject matter is a form for determining and changing a finder magnification when a focal length changes. However, during angle of view adjustment, in some case, it is better not to change the finder magnification.

A third embodiment of the presently disclosed subject matter is a form for determining and changing a finder magnification when zooming is not performed for a fixed time after the zooming is performed. A digital camera 1-2 according to the third embodiment is explained below. Note that explanation is omitted concerning portions same as the portions in the first and second embodiments.

Figure 8A:
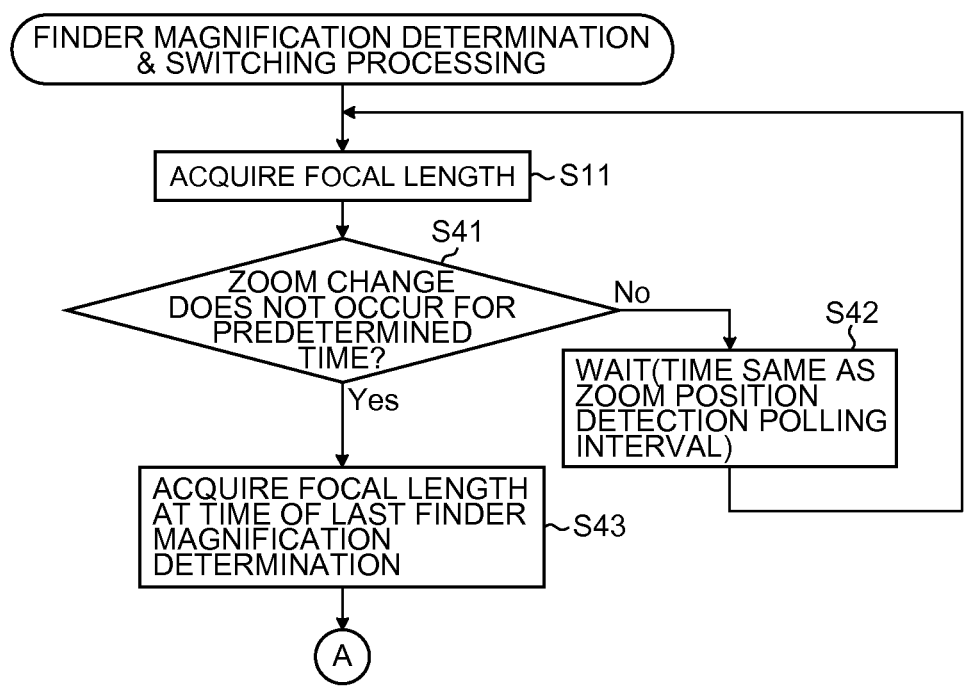
FIG. 8A is a flowchart illustrating a flow of finder magnification switching processing in a third embodiment.
Figure 8B:
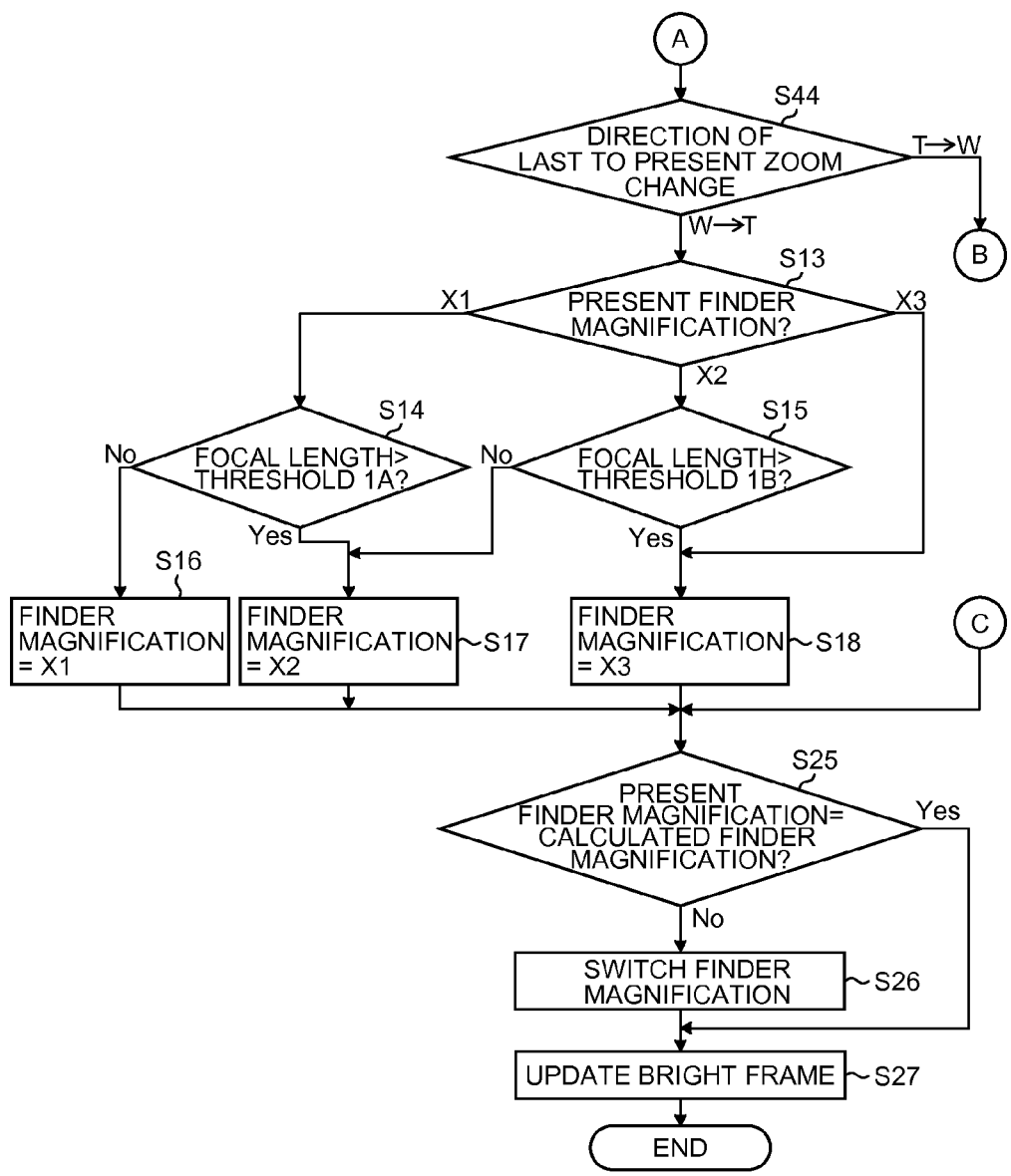
FIG. 8B is a flowchart (continued) illustrating the flow of the finder magnification switching processing in the third embodiment.
Figure 8C:
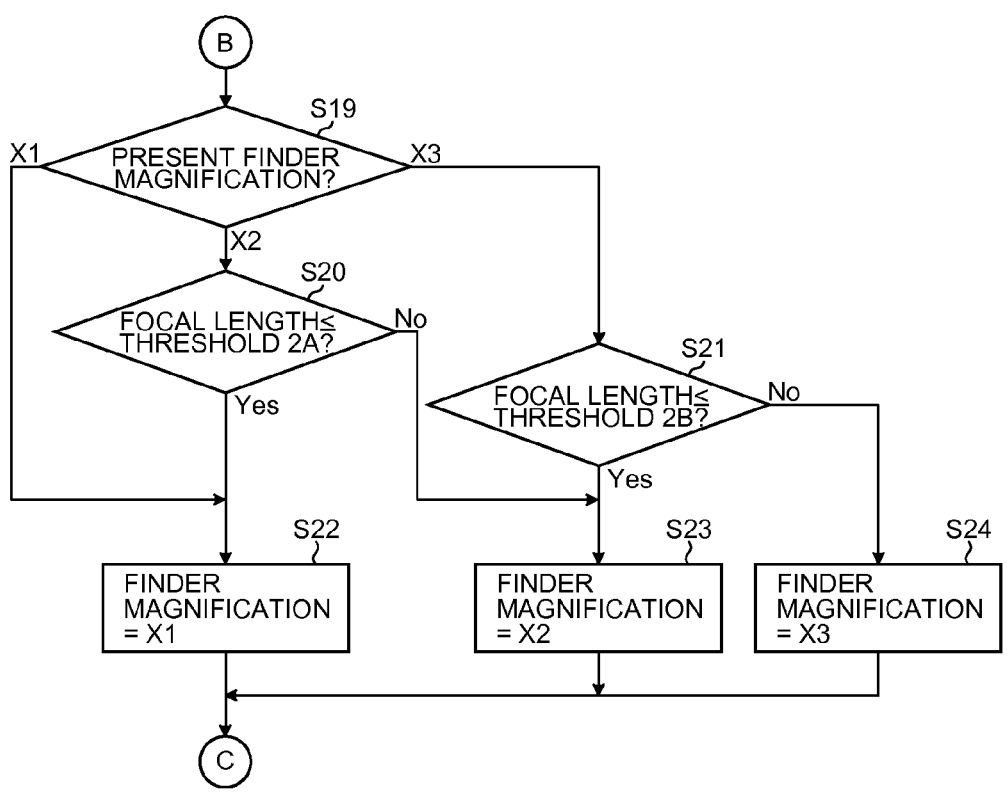
FIG. 8C is a flowchart (continued) illustrating the flow of the finder magnification switching processing in the third embodiment.

FIG. 8A to FIG. 8C are flowcharts illustrating a flow of processing for adjusting a finder magnification. The processing is mainly performed by the CPU 41. The processing is repeatedly carried out at timing (e.g., in units of several ten milliseconds) of periodical detection of the position of the zoom lens 31.

The CPU 41 acquires a focal length from the position of the zoom lens 31 (step S11).

After the zoom lens 31 is moved, the CPU 41 determines whether the zoom lens 31 is not moved, i.e., an imaging angle of view is not changed for a predetermined time (step S41). For example, the CPU 41 detects presence or absence of a zoom change from a difference between a focal length acquired last time and a focal length acquired this time. If the focal length does not change, the CPU 41 acquires time in which the focal length does not change and determines whether the time exceeds a predetermined time. Note that the predetermined time needs to be set to time that always exceeds a polling interval (several ten milliseconds) of zoom position detection. This is because, when the predetermined time is set to time equal to or shorter than the polling interval of the zoom position detection, a finder magnification is switched at a point when a zoom position changes.

When the zoom lens 31 is not moved, when the predetermined time does not elapse after the zoom lens 31 is moved (NO in step S41), the CPU 41 stays on standby for an interval of periodical zoom position detection (e.g., in units of 10 ms) (step S42) and returns to step S11. That is, the CPU 41 repeats the focal length detection (step S11) and the zoom stop time determination (step S41) until the predetermined time elapses.

After the zoom lens 31 is moved, when the predetermined time elapses after the zoom lens 31 is moved (YES in step S41), the CPU 41 acquires the focal length acquired when the determination processing for a finder magnification (steps S13 to S24) is performed before the zoom lens 31 is moved (step S43).

The CPU 41 compares the focal length acquired in step S43 and the focal length acquired in step S11 and determines whether the zoom lens 31 moves from the wide side to the tele-side or moves from the tele-side to the wide side (step S44).

When the zoom lens 31 moves from the wide side to the tele-side, first, the CPU 41 acquires the present finder magnification (step S13). When the finder magnification is ×1 (×1 in step S13), the CPU 41 determines whether the focal length acquired in step S12 is larger than the threshold 1A (step S14). When the focal length is equal to or smaller than the threshold 1A (NO in step S14), the CPU 41 sets the finder magnification to ×1 (step S16). When the focal length is larger than the threshold 1A (YES in step S14), the CPU 41 sets the finder magnification to ×2 (step S17).

When the finder magnification is ×2 (×2 in step S13), the CPU 41 determines whether the focal length acquired in step S12 is larger than the threshold 1B (step S15). When the focal length is equal to or smaller than the threshold 1B (NO in step S15), the CPU 41 sets the finder magnification to ×2 (step S17). When the focal length is larger than the threshold 1B (YES in step S15), the CPU 41 sets the finder magnification to ×3 (step S18).

When the finder magnification is ×3 (×3 in step S13), the CPU 41 sets the finder magnification to ×3 (step S18).

When the zoom lens 31 moves from the tele-side to the wide side, first, the CPU 41 acquires the present finder magnification (step S19). When the finder magnification is ×1 (×1 in step S19), the finder magnification is not setd from ×1 (step S22).

When the finder magnification is ×2 (×2 in step S19), the CPU 41 determines whether the focal length acquired in step S12 is equal to or smaller than the threshold 2A (step S20). When the focal length is equal to or smaller than the threshold 2A (YES in step S20), the CPU 41 sets the finder magnification to ×1 (step S22). When the focal length is larger than the threshold 2A (NO in step S20), the CPU 41 sets the finder magnification to ×2 (step S23).

When the finder magnification is ×3 (×3 in step S19), the CPU 41 determines whether the focal length acquired in step S12 is equal to or smaller than the threshold 2B (step S21). When the focal length is equal to or smaller than the threshold 2B (YES in step S21), the CPU 41 sets the finder magnification to ×2 (step S23). When the focal length is larger than the threshold 2B (NO in step S21), the CPU 41 sets the finder magnification to ×3 (step S24).

The CPU 41 determines whether the present finder magnification acquired in step S13 or S19 and the finder magnification determined in steps S16 to S18 or steps S22 to S24 are equal to each other (step S25). When they are equal to each other (YES in step S25), the CPU 41 proceeds to step S27. When they are different (NO in step S25), the CPU 41 inserts or removes the insertion lenses via the driver 23 and changes the present finder magnification to the finder magnification determined in steps S16 to S18 or steps S22 to S24 (step S26).

After the finder magnification is switched (step S26) or when the present finder magnification and the determined finder magnification are the same (YES in step S25), the CPU 41 displays the bright frame F on the electronic view finder 52 on the basis of the focal length acquired in step S11 and the finder magnification switched in step S26 (step S27).

According to this embodiment, while the zoom lens 31 of the imaging optical system 12 is being moved, the magnification of the optical finder can be always fixed. Therefore, it is possible to further reduce annoyance of the user and allow the user to easily adjust an imaging angle of view.

<Modification of the Third Embodiment>

Figure 9A:
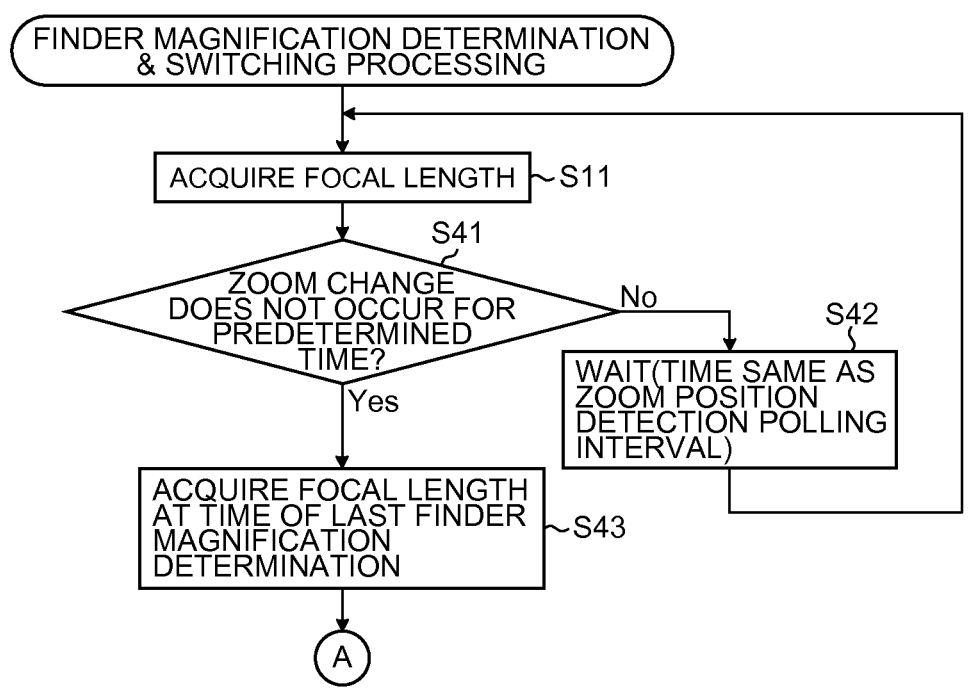
FIG. 9A is a flowchart illustrating a flow of finder magnification switching processing in a modification of the third embodiment.
Figure 9B:
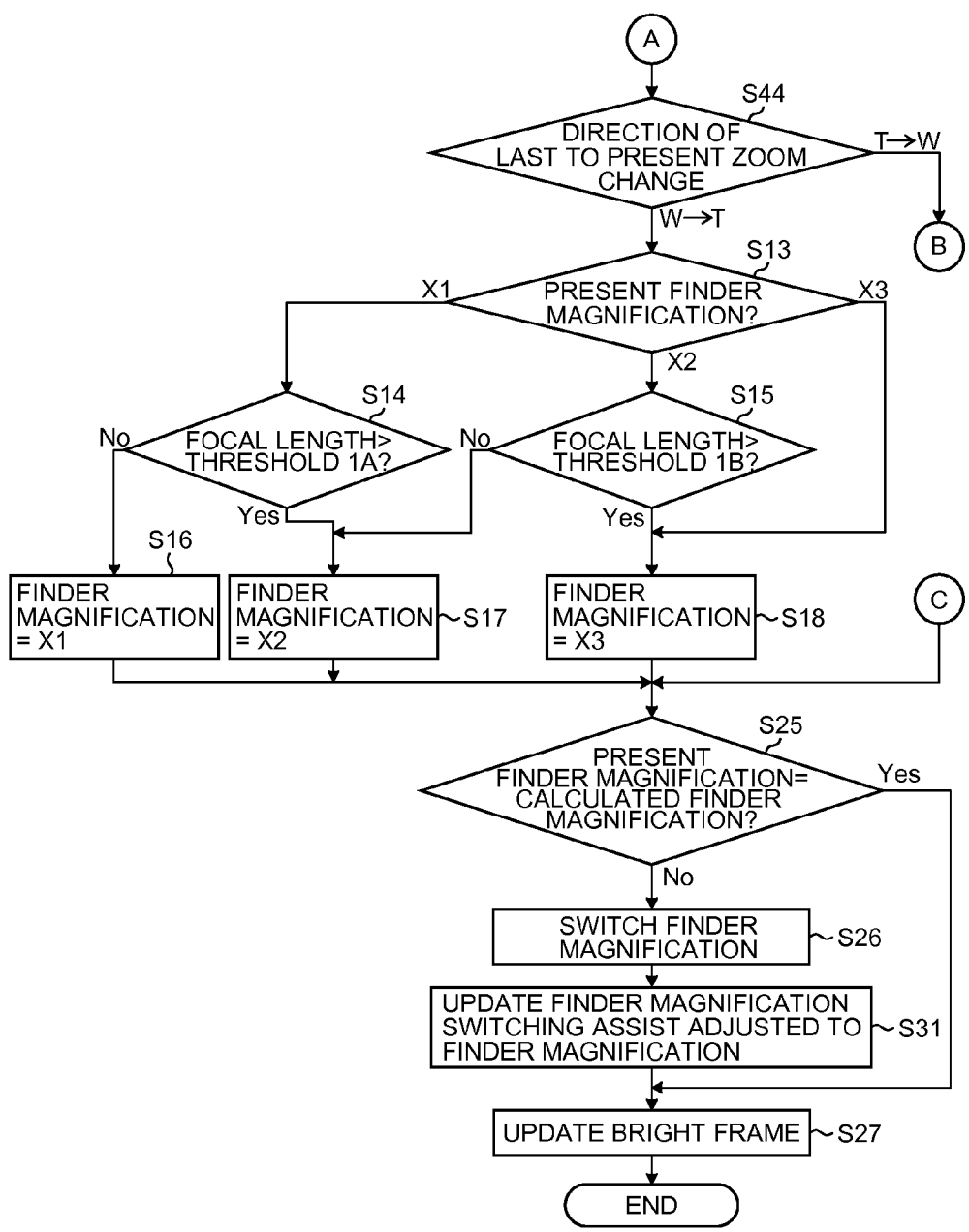
FIG. 9B is a flowchart (continued) illustrating the flow of the finder magnification switching processing in the modification of the third embodiment.
Figure 9C:
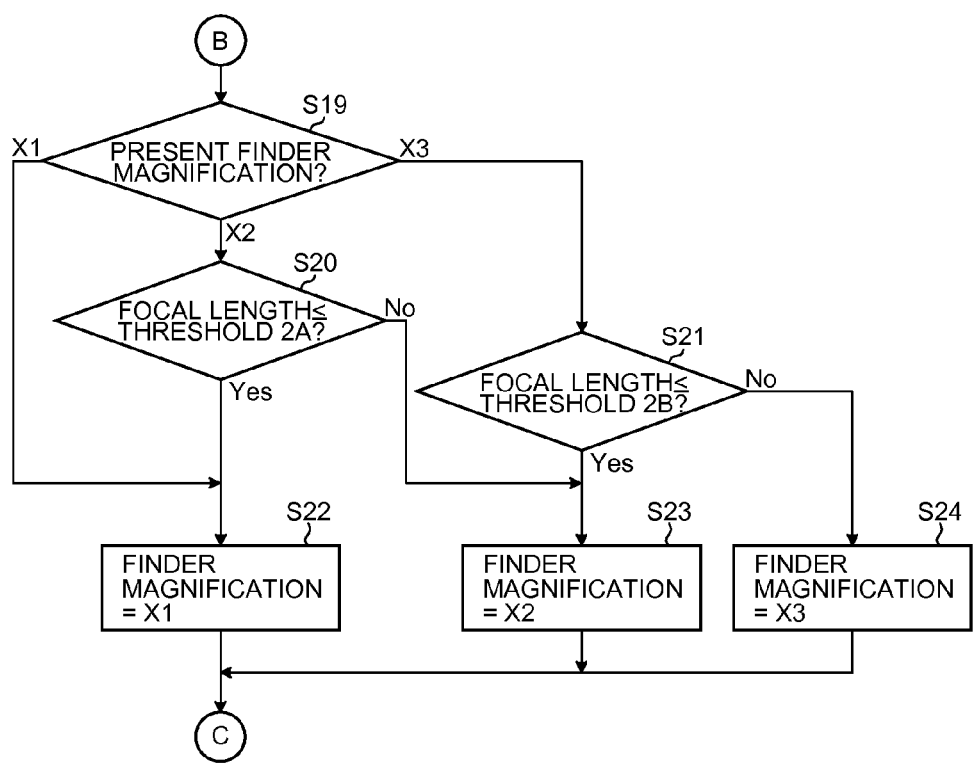
FIG. 9C is a flowchart (continued) illustrating the flow of the finder magnification switching processing in the modification of the third embodiment.

FIG. 9A to FIG. 9C are flowcharts illustrating a flow of processing for adjusting a finder magnification in a modification of the third embodiment. A difference between the third embodiment and the modification of the third embodiment is whether a finder magnification switching assist is displayed. Note that portions same as the portions illustrated in FIG. 8 are designated by the same reference characters and explanation of the portions is omitted.

After switching the finder magnification (step S26), the CPU 41 displays the finder magnification switching assist on the electronic view finder 52 on the basis of the focal length acquired in step S11 and the finder magnification switched in step S26 (step S31). Consequently, when zooming is performed or when the finder magnification changes, it is possible to update a bright frame and the finder magnification switching assist.

<Fourth Embodiment>

In the third embodiment of the presently disclosed subject matter, a finder magnification is determined and changed when zooming is not performed for a fixed time after the zooming is performed. In this embodiment, an angle of view of a finder is prevented from decreasing to be smaller than a proper bright frame size irrespective of a zoom driving direction in the third embodiment.

The fourth embodiment of the presently disclosed subject matter is a form for changing a finder magnification to 1 when zooming is performed. A digital camera 1-3 according to the fourth embodiment is explained below. Note that explanation is omitted concerning portions same as the portions in the first to third embodiments.

Figure 10A:
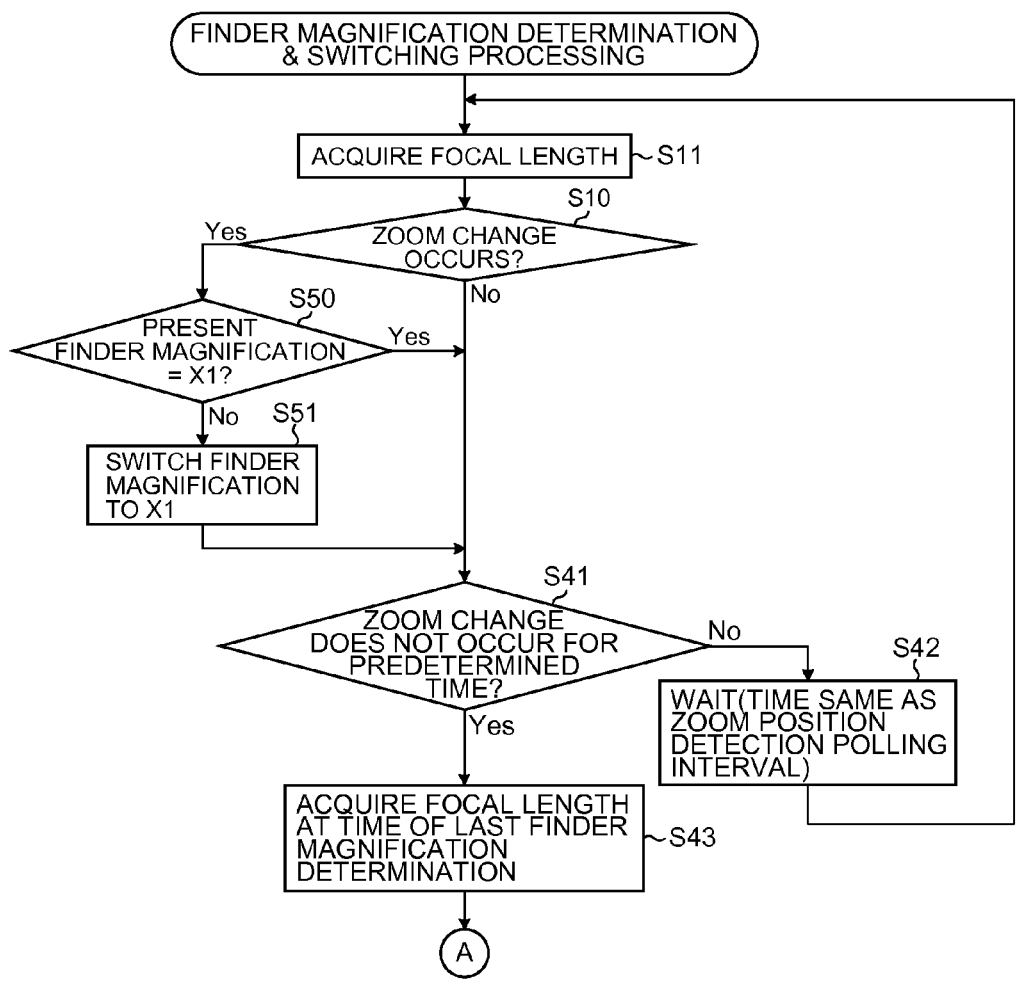
FIG. 10A is a flowchart illustrating a flow of finder magnification switching processing in a fourth embodiment.
Figure 10B:
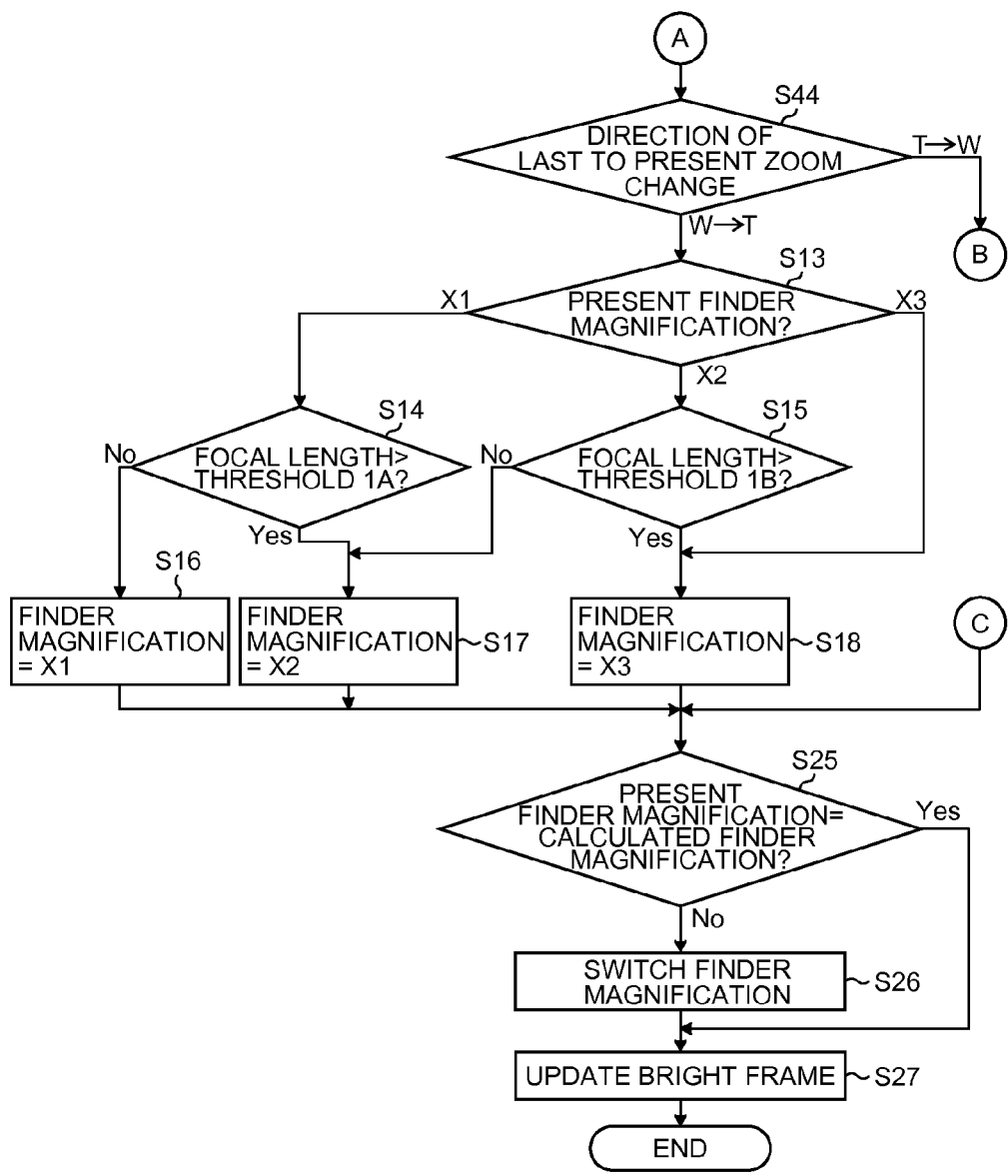
FIG. 10B is a flowchart (continued) illustrating the flow of the finder magnification switching processing in the fourth embodiment.
Figure 10C:
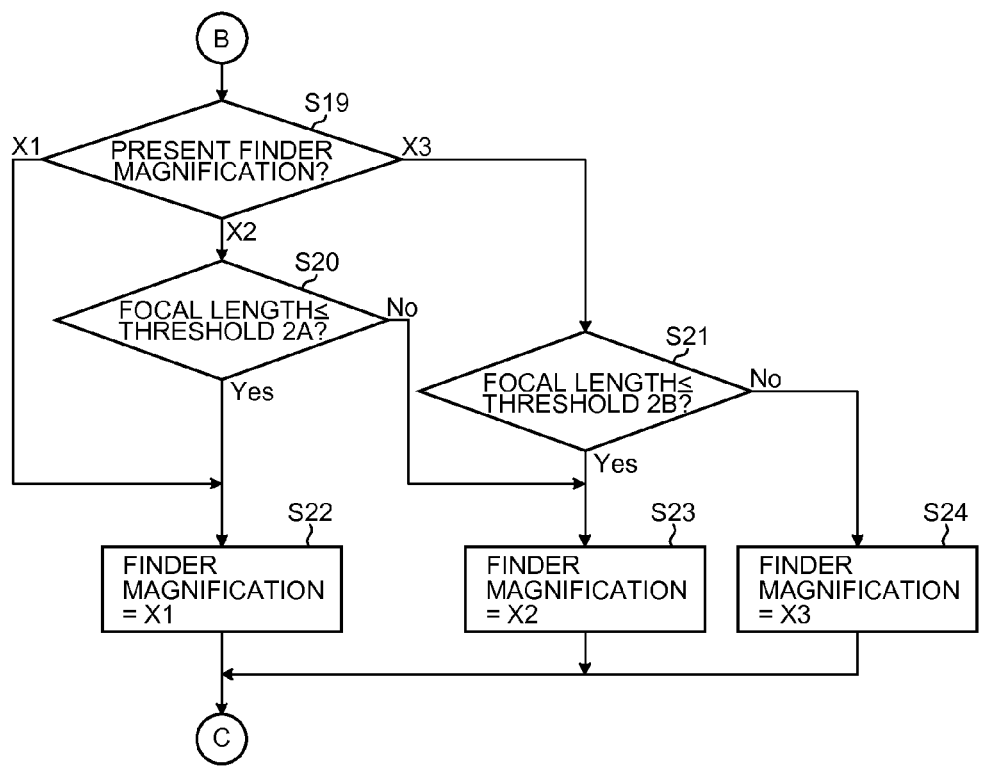
FIG. 10C is a flowchart (continued) illustrating the flow of the finder magnification switching processing in the fourth embodiment.

FIG. 10A to FIG. 10C are flowcharts illustrating a flow of processing for adjusting a finder magnification. The processing is mainly performed by the CPU 41. The processing is repeatedly carried out at timing (e.g., in units of several ten milliseconds) of periodical detection of the position of the zoom lens 31.

The CPU 41 acquires a focal length from the position of the zoom lens 31 (step S11). The CPU 41 determines whether a zoom position changes (step S10). When the zoom position changes (YES in step S10), the CPU 41 determines whether the present finder magnification is ×1 (step S50). When the present finder magnification is not ×1 (NO in step S50), the CPU 41 switches the finder magnification to ×1 (step S51). That is, when there is a zoom change, the CPU 41 changes the finder magnification to a widest angle (×1).

When the zoom position does not change (NO in step S10), when the present finder magnification is ×1 (YES in step S50), the CPU 41 determines whether the zoom lens 31 is not moved for a predetermined time after the zoom lens 31 is moved (step S41).

When the zoom lens 31 is not moved, when the predetermined time does not elapse after the zoom lens 31 is moved (NO in step S41), the CPU 41 stays on standby for an interval of periodical zoom position detection (e.g., in units of 10 milliseconds) (step S42) and returns to step S11. That is, the CPU 41 repeats the focal length detection (step S11) and the zoom stop time determination (step S41) until the predetermined time elapses.

When the predetermined time elapses after the zoom lens 31 is moved (YES in step S41), the CPU 41 acquires the focal length acquired when the determination processing for a finder magnification (steps S13 to S24) is performed before that (step S43).

The CPU 41 compares the focal length acquired in step S43 and the focal length acquired in step S11 and determines whether the zoom lens 31 moves from the wide side to the tele-side or moves from the tele-side to the wide side (step S44).

When the zoom lens 31 moves from the wide side to the tele-side, first, the CPU 41 acquires the present finder magnification (step S13). When the finder magnification is ×1 (×1 in step S13), the CPU 41 determines whether the focal length acquired in step S12 is larger than the threshold 1A (step S14). When the focal length is equal to or smaller than the threshold 1A (NO in step S14), the CPU 41 sets the finder magnification to ×1 (step S16). When the focal length is larger than the threshold 1A (YES in step S14), the CPU 41 sets the finder magnification to ×2 (step S17).

When the finder magnification is ×2 (×2 in step S13), the CPU 41 determines whether the focal length acquired in step S12 is larger than the threshold 1B (step S15). When the focal length is equal to or smaller than the threshold 1B (NO in step S15), the CPU 41 sets the finder magnification to ×2 (step S17). When the focal length is larger than the threshold 1B (YES in step S15), the CPU 41 sets the finder magnification to ×3 (step S18).

When the finder magnification is ×3 (×3 in step S13), the CPU 41 sets the finder magnification to ×3 (step S18).

When the zoom lens 31 moves from the tele-side to the wide side, first, the CPU 41 acquires the present finder magnification (step S19). When the finder magnification is ×1 (×1 in step S19), the finder magnification is not changed from ×1 (step S22).

When the finder magnification is ×2 (×2 in step S19), the CPU 41 determines whether the focal length acquired in step S12 is equal to or smaller than the threshold 2A (step S20). When the focal length is equal to or smaller than the threshold 2A (YES in step S20), the CPU 41 sets the finder magnification to ×1 (step S22). When the focal length is larger than the threshold 2A (NO in step S20), the CPU 41 sets the finder magnification to ×2 (step S23).

When the finder magnification is ×3 (×3 in step S19), the CPU 41 determines whether the focal length acquired in step S12 is equal to or smaller than the threshold 2B (step S21). When the focal length is equal to or smaller than the threshold 2B (YES in step S21), the CPU 41 sets the finder magnification to ×2 (step S23). When the focal length is larger than the threshold 2B (NO in step S21), the CPU 41 sets the finder magnification to ×3 (step S24).

The CPU 41 determines whether the present finder magnification acquired in step S13 or S19 and the finder magnification determined in steps S16 to S18 or steps S22 to S24 are equal to each other (step S25). When they are equal to each other (YES in step S25), the CPU 41 proceeds to step S27. When the finder magnifications are different (NO in step S25), the CPU 41 inserts or removes the insertion lenses via the driver 23 and changes the present finder magnification to the finder magnification determined in steps S16 to S18 or steps S22 to S24 (step S26).

After the finder magnification is switched (step S26) or when the present finder magnification and the determined finder magnification are the same (YES in step S25), the CPU 41 displays the bright frame F on the electronic view finder 52 on the basis of the focal length acquired in step S11 and the finder magnification switched in step S26 (step S27).

According to this embodiment, while the zoom lens 31 of the imaging optical system 12 is being moved, the finder magnification is always fixed. Therefore, it is possible to further reduce annoyance of the user and allow the user to easily adjust an imaging angle of view. A finder angle of view is always not smaller than a proper bright frame size. It is possible to check the imaging angle of view in all zoom positions.

<Fifth Embodiment>

The first embodiment of the presently disclosed subject matter is a form for determining and changing a finder magnification when a focal length changes. However, during angle of view adjustment, in some case, it is better not to change the finder magnification.

A fifth embodiment of the presently disclosed subject matter is a form for varying whether a finder magnification is changed according to the speed of zooming. A digital camera 1-4 according to the fifth embodiment is explained below. Note that explanation is omitted concerning portions same as the portions in the first to fourth embodiments.

Figure 11A:
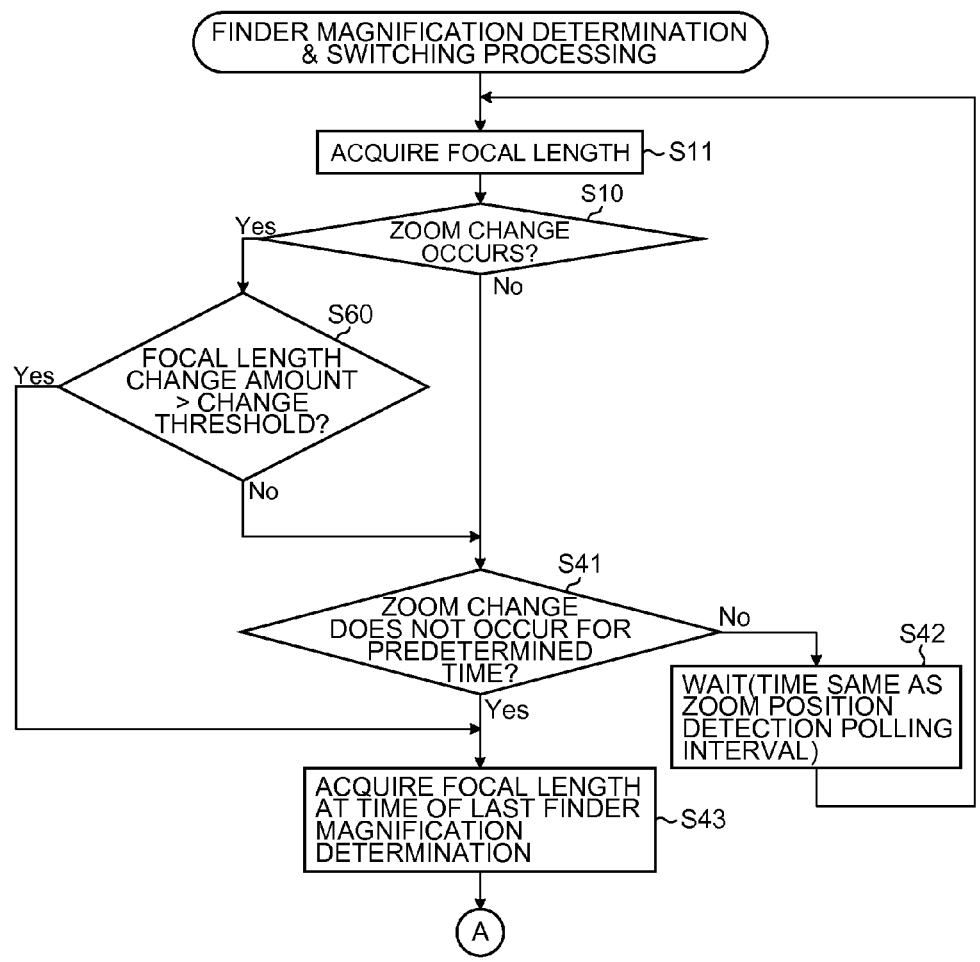
FIG. 11A is a flowchart illustrating a flow of finder magnification switching processing in a fifth embodiment.
Figure 11B:
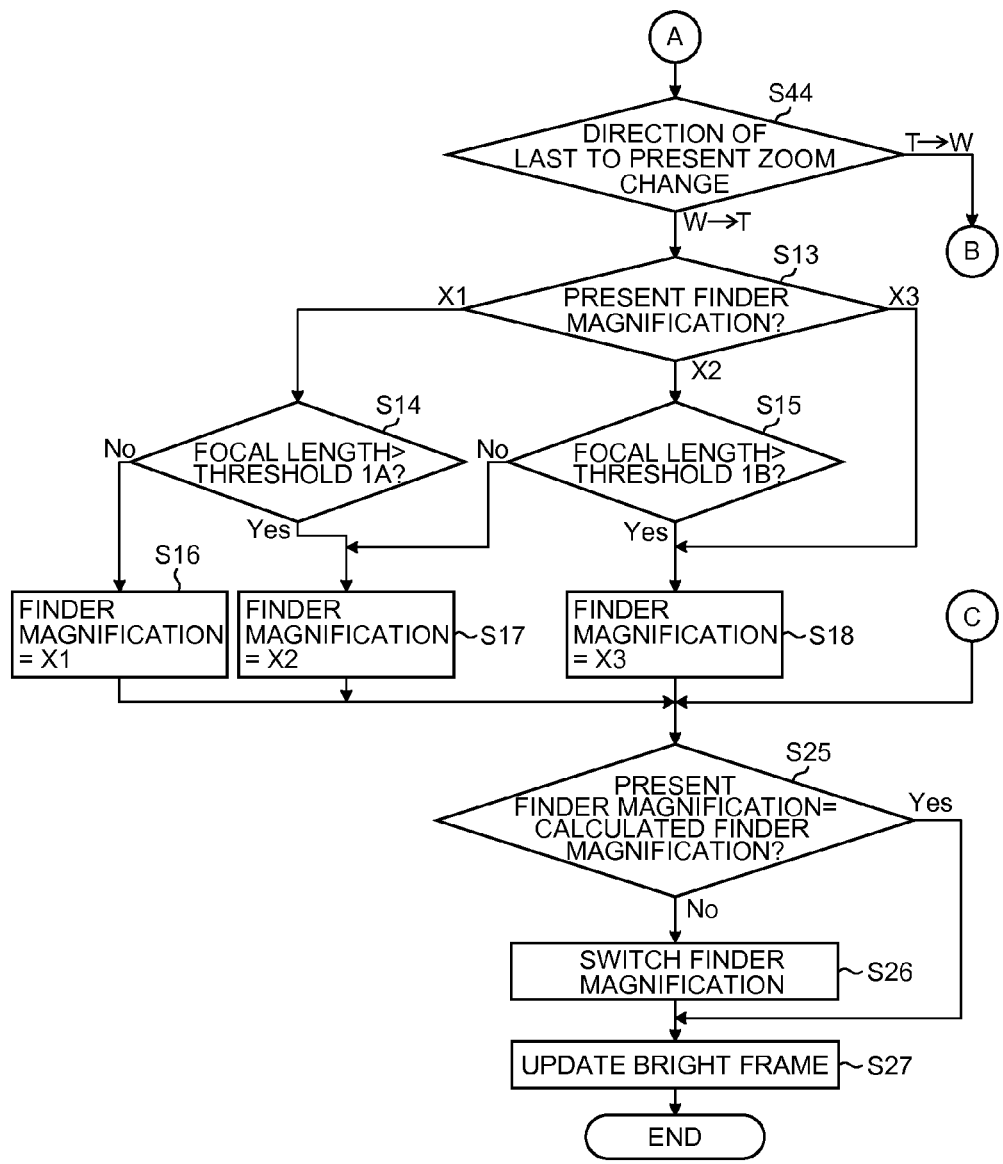
FIG. 11B is a flowchart (continued) illustrating the flow of the finder magnification switching processing in the fifth embodiment.
Figure 11C:
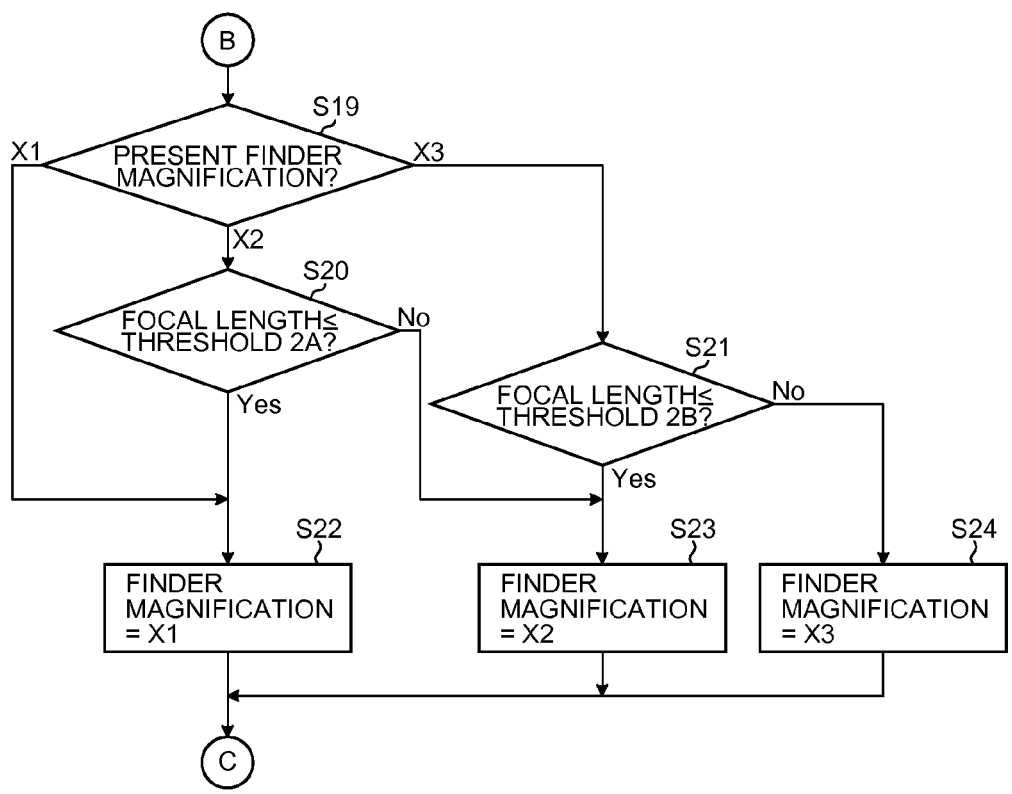
FIG. 11C is a flowchart (continued) illustrating the flow of the finder magnification switching processing in the fifth embodiment.

FIG. 11A to FIG. 11C are flowcharts illustrating a flow of processing for adjusting a finder magnification. The processing is mainly performed by the CPU 41. The processing is repeatedly carried out at timing (e.g., in units of several ten milliseconds) of periodical detection of the position of the zoom lens 31.

The CPU 41 acquires a focal length from the position of the zoom lens 31 (step S11). The CPU 41 determines whether a zoom position changes (step S10). When the zoom position changes (YES in step S10), the CPU 41 calculates a change amount between a focal length acquired in processing for adjusting a finder magnification performed last time and a focal length acquired in processing for adjusting a finder magnification of this time and determines whether the change amount exceeds a change threshold (step S60). The change amount of the focal lengths is calculated on the basis of equations illustrated in Expression 2.

Focal length change amount in a wide to tele direction (times)=focal length after change (mm)/focal length before change (mm) [Expression 2]

Focal length change amount in a tele to wide direction (times)=focal length before change (mm)/focal length after change (mm)

When the change amount of the focal lengths does not exceed the threshold (NO in step S60), it is conceivable that delicate angle of view adjustment is performed. In this case, the CPU 41 determines whether the zoom lens 31 is not moved for a predetermined time after the zoom lens 31 is moved (step S41).

When the zoom lens 31 is not moved, when a predetermined time does not elapse after the zoom lens 31 is moved (NO in step S41), the CPU 41 stays on standby for an interval of periodical zoom position detection (e.g., in units of 10 milliseconds) (step S42) and returns to step S11. That is, the CPU 41 repeats the focal length detection (step S11) and the zoom stop time determination (step S41) until the predetermined time elapses. That is, when the user performs delicate angle of view adjustment, switching of the finder magnification is not performed during the zoom lens 31 driving to make it easy to perform the angle of view adjustment.

When the change amount of the focal lengths exceeds the threshold (YES in step S60), it is conceivable that the zooming is performed all at once. In this case, the CPU 41 does not perform the zoom stop time determination (steps S41 and S42) and makes it possible to quickly switch the finder magnification. Therefore, when the change amount of the focal lengths exceeds the threshold (YES in step S60) and the predetermined time elapses after the zoom lens 31 is moved (YES in step S41), the CPU 41 acquires the focal length acquired when the determination processing for a finder magnification (steps S13 to S24) is performed before that (step S43).

The CPU 41 compares the focal length acquired in step S43 and the focal length acquired in step S11. The CPU 41 determines whether the zoom lens 31 moves from the wide side to the tele-side or moves from the tele-side to the wide side (step S44).

When the zoom lens 31 moves from the wide side to the tele-side, first, the CPU 41 acquires the present finder magnification (step S13). When the finder magnification is ×1 (×1 in step S13), the CPU 41 determines whether the focal length acquired in step S12 is larger than the threshold 1A (step S14). When the focal length is equal to or smaller than the threshold 1A (NO in step S14), the CPU 41 sets the finder magnification to ×1 (step S16). When the focal length is larger than the threshold 1A (YES in step S14), the CPU 41 sets the finder magnification to ×2 (step S17).

When the finder magnification is ×2 (×2 in step S13), the CPU 41 determines whether the focal length acquired in step S12 is larger than the threshold 1B (step S15). When the focal length is equal to or smaller than the threshold 1B (NO in step S15), the CPU 41 sets the finder magnification to ×2 (step S17). When the focal length is larger than the threshold 1B (YES in step S15), the CPU 41 sets the finder magnification to ×3 (step S18).

When the finder magnification is ×3 (×3 in step S13), the CPU 41 sets the finder magnification to ×3 (step S18).

When the zoom lens 31 moves from the tele-side to the wide side, first, the CPU 41 acquires the present finder magnification (step S19). When the finder magnification is ×1 (×1 in step S19), the finder magnification is not setd from ×1 (step S22).

When the finder magnification is ×2 (×2 in step S19), the CPU 41 determines whether the focal length acquired in step S12 is equal to or smaller than the threshold 2A (step S20). When the focal length is equal to or smaller than the threshold 2A (YES in step S20), the CPU 41 sets the finder magnification to ×1 (step S22). When the focal length is larger than the threshold 2A (NO in step S20), the CPU 41 sets the finder magnification to ×2 (step S23).

When the finder magnification is ×3 (×3 in step S19), the CPU 41 determines whether the focal length acquired in step S12 is equal to or smaller than the threshold 2B (step S21). When the focal length is equal to or smaller than the threshold 2B (YES in step S21), the CPU 41 sets the finder magnification to ×2 (step S23). When the focal length is larger than the threshold 2B (NO in step S21), the CPU 41 sets the finder magnification to ×3 (step S24).

The CPU 41 determines whether the present finder magnification acquired in step S13 or S19 and the finder magnification determined in steps S16 to S18 or steps S22 to S24 are equal to each other (step S25). When they are equal to each other (YES in step S25), the CPU 41 proceeds to step S27. When the finder magnifications are different (NO in step S25), the CPU 41 inserts or removes the insertion lenses via the driver 23 and changes the present finder magnification to the finder magnification determined in steps S16 to S18 or steps S22 to S24 (step S26).

After the finder magnification is switched (step S26) or when the present finder magnification and the determined finder magnification are the same (YES in step S25), the CPU 41 displays the bright frame F on the electronic view finder 52 on the basis of the focal length acquired in step S11 and the finder magnification switched in step S26 (step S27).

According to this embodiment, when the user performs delicate angle of view adjustment while performing the zooming, while not switching the finder magnification during zoom driving to make it easy to perform angle of view adjustment, when zooming is performed all at once, by making it possible to quickly switch the finder magnification, it is possible to enable the user to immediately shift to the delicate angle of view adjustment after the zooming.

<Modification of the Fifth Embodiment>

Figure 12A:
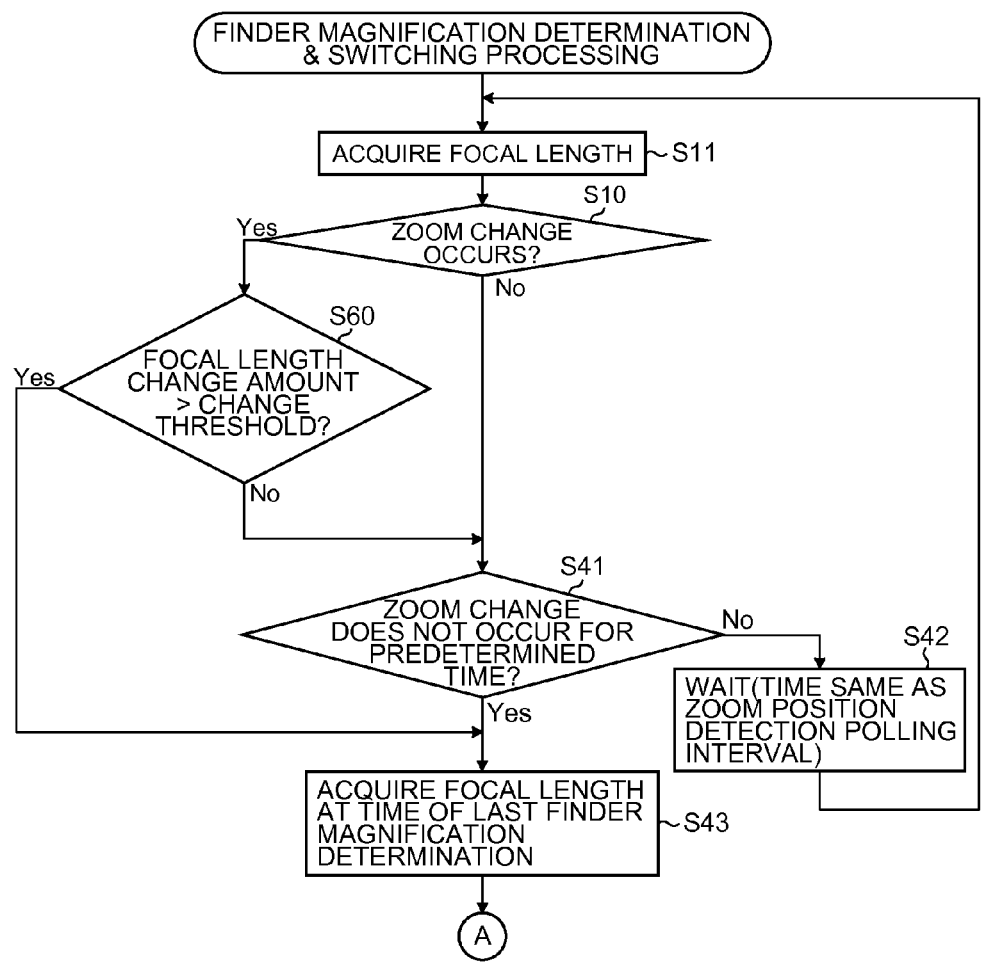
FIG. 12A is a flowchart illustrating a flow of finder magnification switching processing in a modification of the fifth embodiment.
Figure 12B:
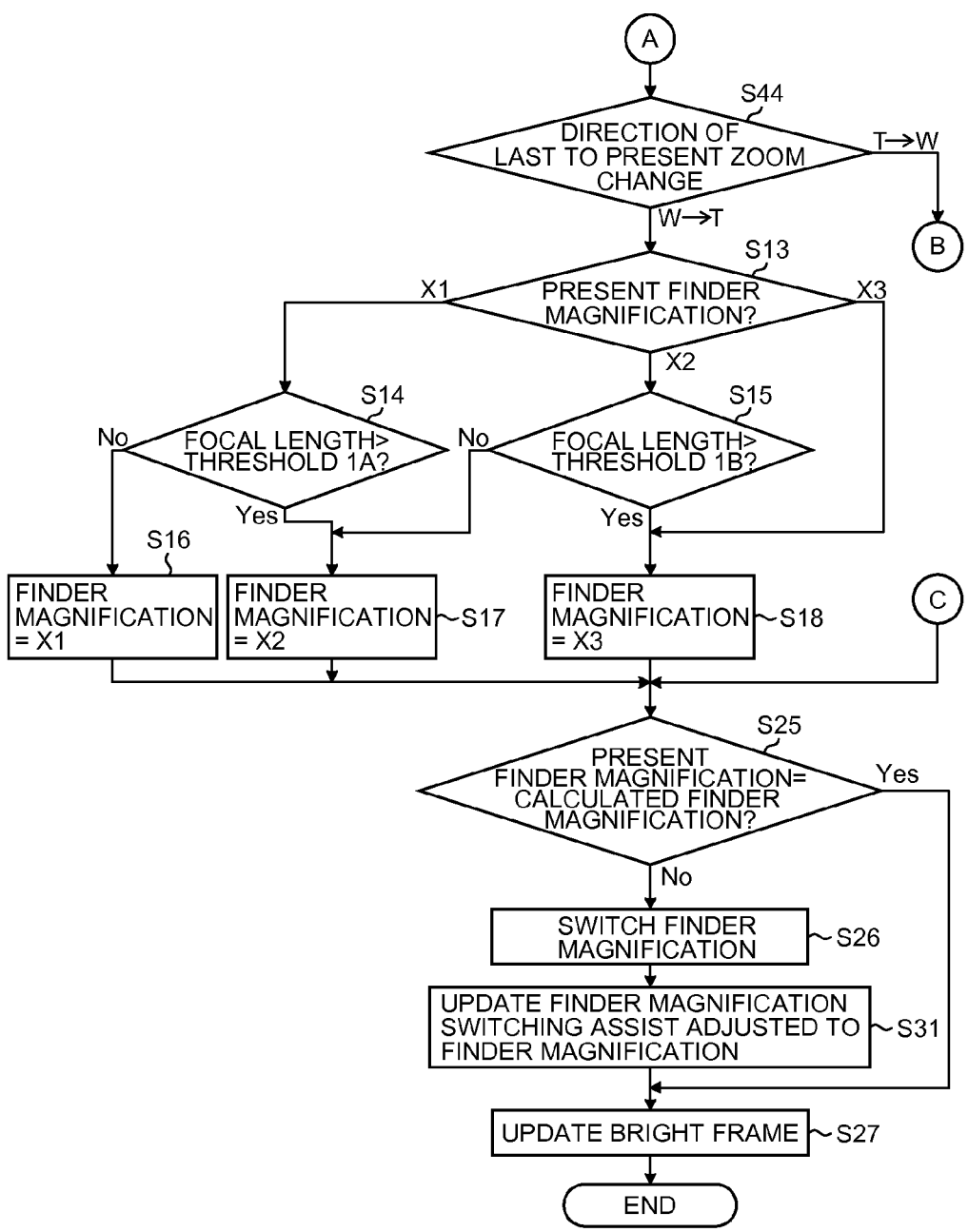
FIG. 12B is a flowchart (continued) illustrating the flow of the finder magnification switching processing in the modification of the fifth embodiment.
Figure 12C:
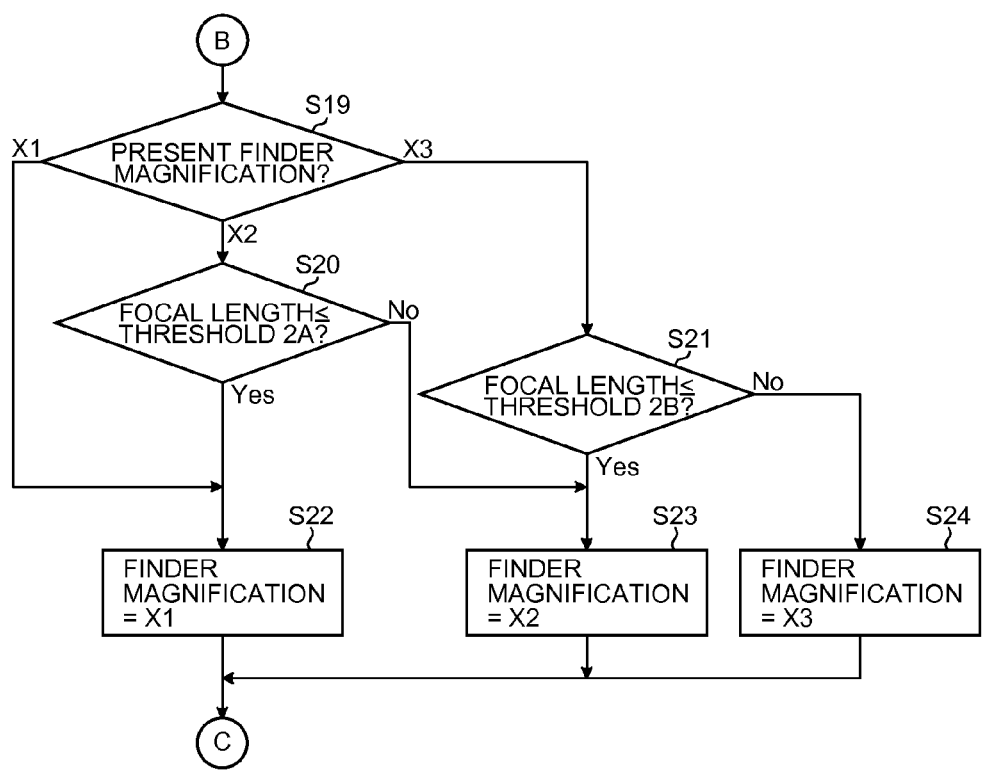
FIG. 12C is a flowchart (continued) illustrating the flow of the finder magnification switching processing in the modification of the fifth embodiment.

FIG. 12A to FIG. 12C are flowcharts illustrating a flow of processing for adjusting a finder magnification in a modification of the fifth embodiment. A difference between the fifth embodiment and the modification of the fifth embodiment is whether a finder magnification switching assist is displayed. Note that portions same as the portions illustrated in FIG. 8 are designated by the same reference characters and explanation of the portions is omitted.

After switching the finder magnification (step S26), the CPU 41 displays the finder magnification switching assist on the electronic view finder 52 on the basis of the focal length acquired in step S11 and the finder magnification switched in step S26 (step S31). Consequently, when zooming is performed or when the finder magnification changes, it is possible to update a bright frame and the finder magnification switching assist.

<Sixth Embodiment>

The fifth embodiment of the presently disclosed subject matter is a form for varying the switching processing for a finder magnification according to the speed of zooming. However, a method of varying the switching processing for a finder magnification is not limited to this.

A sixth embodiment of the presently disclosed subject matter is a form for varying a threshold of a zoom stop time according to the speed of zooming. A digital camera 1-5 according to the sixth embodiment is explained below. Note that explanation is omitted concerning portions same as the portions in the first to fifth embodiments.

Figure 13A:
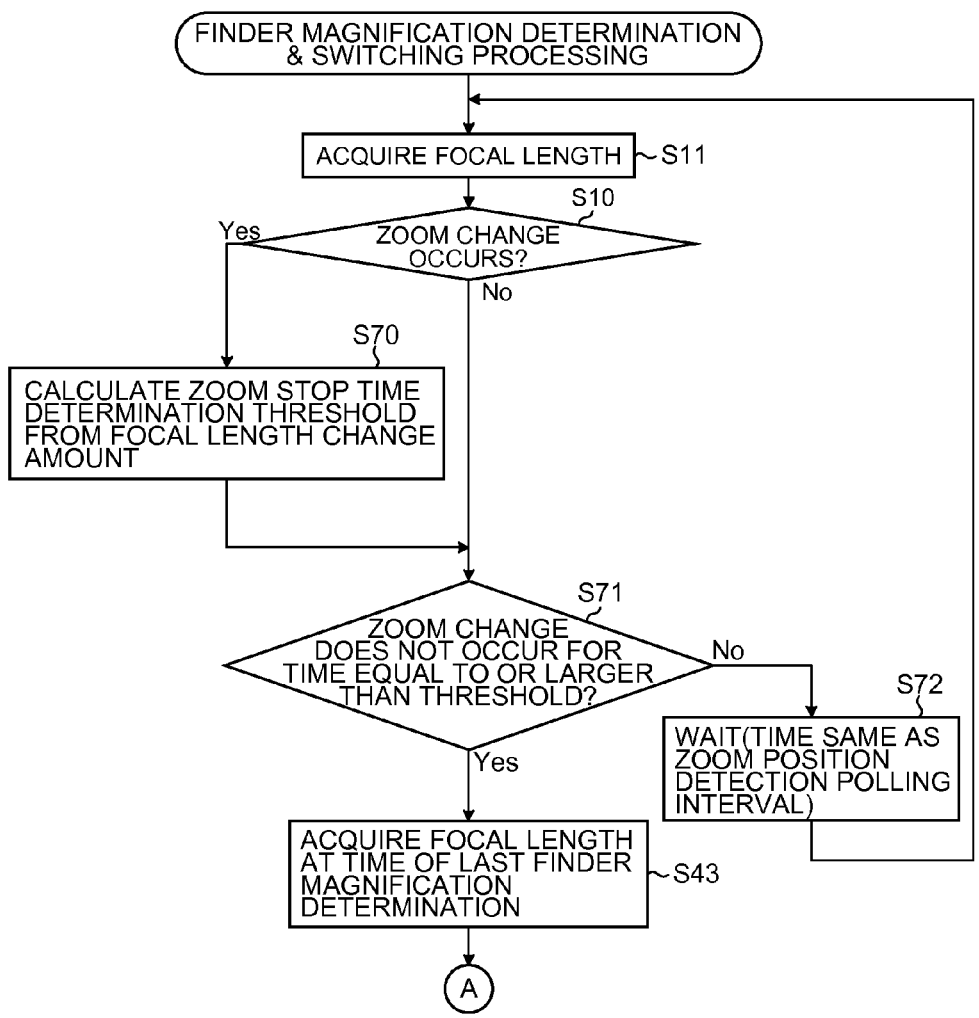
FIG. 13A is a flowchart illustrating a flow of finder magnification switching processing in a sixth embodiment.
Figure 13B:
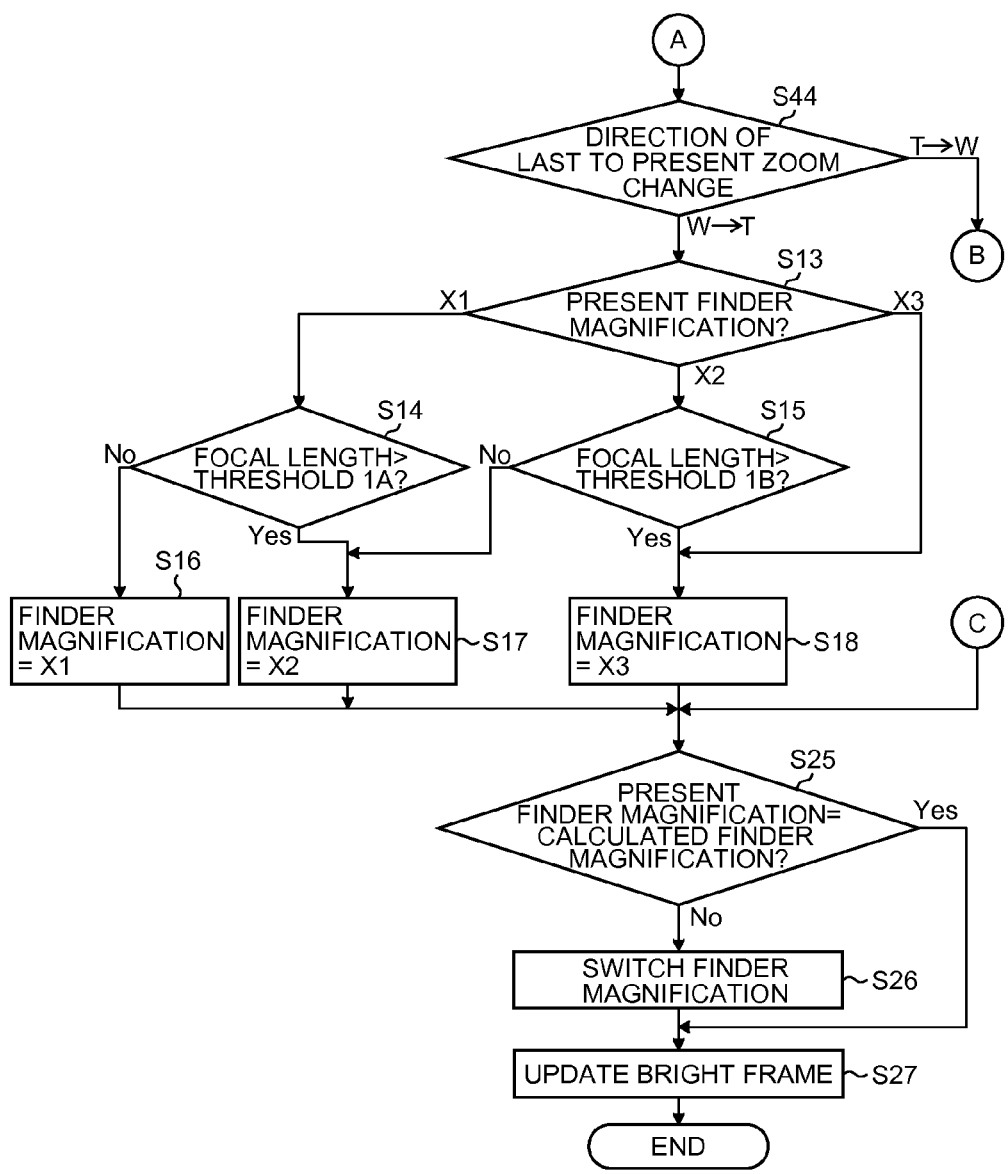
FIG. 13B is a flowchart (continued) illustrating the flow of the finder magnification switching processing in the sixth embodiment.
Figure 13C:
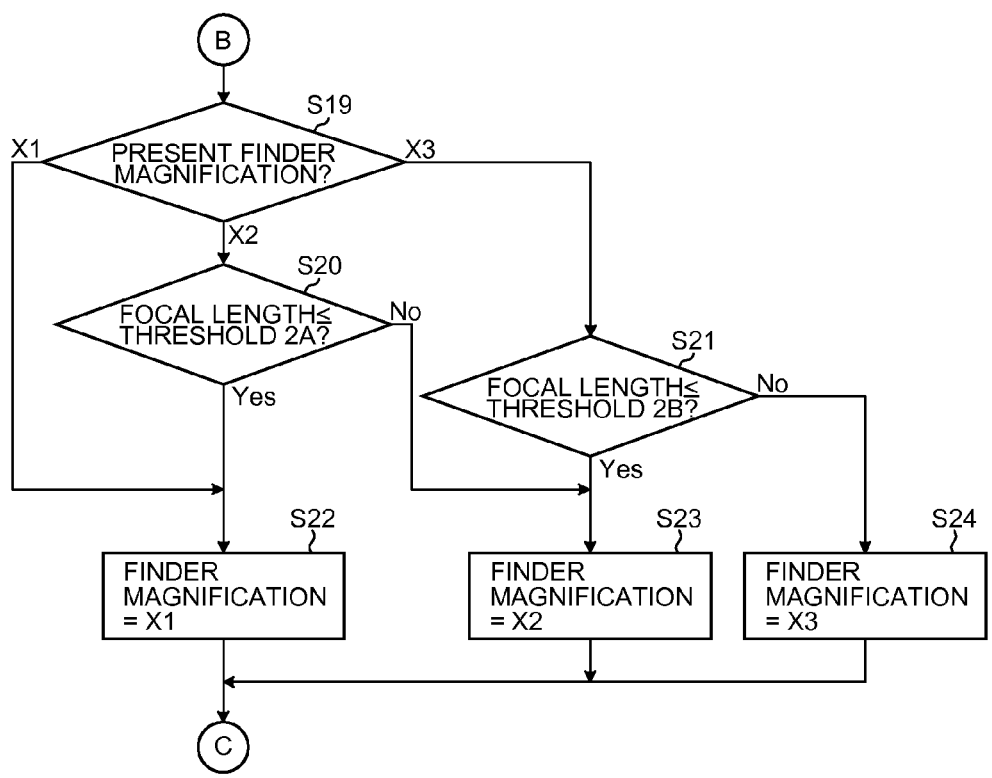
FIG. 13C is a flowchart (continued) illustrating the flow of the finder magnification switching processing in the sixth embodiment.

FIG. 13A to FIG. 13C are flowcharts illustrating a flow of processing for adjusting a finder magnification. The processing is mainly performed by the CPU 41. The processing is repeatedly carried out at timing (e.g., in units of several ten milliseconds) of periodical detection of the position of the zoom lens 31.

The CPU 41 acquires a focal length from the position of the zoom lens 31 (step S11). The CPU 41 determines whether a zoom position changes (step S10). When the zoom position changes (YES in step S10), the CPU 41 calculates a change amount between a focal length acquired in processing for adjusting a finder magnification performed last time and a focal length acquired in processing for adjusting a finder magnification of this time and calculates a zoom stop time determination threshold according to the change amount (step S70).

Figure 14:
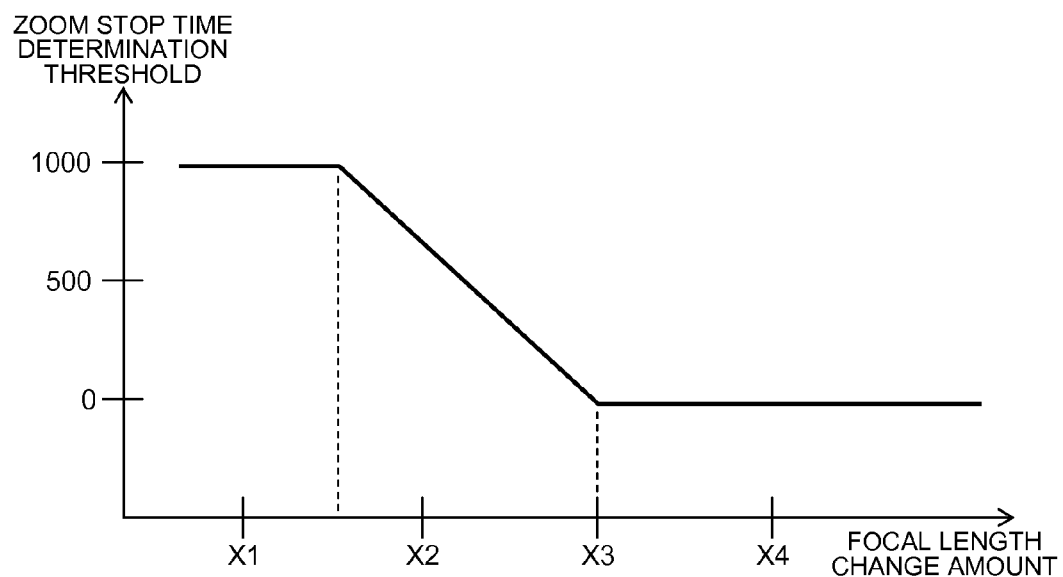
FIG. 14 is a diagram illustrating a relation between a change amount of a focal length and a zoom stop time determination threshold.

FIG. 14 is a graph illustrating a relation between the zoom determination time threshold and the change amount of the focal length. In this embodiment, the CPU 41 determines the zoom determination time threshold on the basis of the graph. According to the graph illustrated in FIG. 14, when the change amount is equal to or smaller than 1.5 times, the zoom determination time threshold is fixed at 1000 milliseconds. When the change amount is equal to or larger than three times, the zoom determination time threshold is fixed at 0 millisecond. That is, when zooming is performed quickly, it is possible to immediately switch a finder magnification. When the change amount is between 1.5 times and three times, the zoom stop time determination threshold is switched in a stepless manner according to a focal length change amount such that the zoom stop time determination threshold decreases as the change amount increases. Note that the graph is an example. The relation between the zoom determination time threshold and the change amount of the focal length is not limited to this.

After the zoom lens 31 is moved, the CPU 41 determines whether time in which the zoom lens 31 is not moved is equal to or longer than the zoom stop time determination threshold determined in step S70 (step S71).

When the zoom lens 31 is not moved, when time equal to or longer than the zoom stop time determination threshold does not elapse after the zoom lens 31 is moved (NO in step S71), the CPU 41 stays on standby for an interval of periodical zoom position detection (e.g., in units of 10 milliseconds) (step S72) and returns to step S11.

When the time equal to or longer than the zoom stop time determination threshold elapses after the zoom lens 31 is moved (YES in step S71), it is conceivable that zooming is performed all at once, for example. Therefore, the CPU 41 makes it possible to quickly switch the finder magnification. That is, the CPU 41 acquires the focal length acquired when the determination processing for a finder magnification (steps S13 to S24) is performed before that (step S43).

The CPU 41 compares the focal length acquired in step S43 and the focal length acquired in step S11 and determines whether the zoom lens 31 moves from the wide side to the tele-side or moves from the tele-side to the wide side (step S44).

When the zoom lens 31 moves from the wide side to the tele-side, first, the CPU 41 acquires the present finder magnification (step S13). When the finder magnification is ×1 (×1 in step S13), the CPU 41 determines whether the focal length acquired in step S12 is larger than the threshold 1A (step S14). When the focal length is equal to or smaller than the threshold 1A (NO in step S14), the CPU 41 sets the finder magnification to ×1 (step S16). When the focal length is larger than the threshold 1A (YES in step S14), the CPU 41 sets the finder magnification to ×2 (step S17).

When the finder magnification is ×2 (×2 in step S13), the CPU 41 determines whether the focal length acquired in step S12 is larger than the threshold 1B (step S15). When the focal length is equal to or smaller than the threshold 1B (NO in step S15), the CPU 41 sets the finder magnification to ×2 (step S17). When the focal length is larger than the threshold 1B (YES in step S15), the CPU 41 sets the finder magnification to ×3 (step S18).

When the finder magnification is ×3 (×3 in step S13), the CPU 41 sets the finder magnification to ×3 (step S18).

When the zoom lens 31 moves from the tele-side to the wide side, first, the CPU 41 acquires the present finder magnification (step S19). When the finder magnification is ×1 (×1 in step S19), the finder magnification is not changed from ×1 (step S22).

When the finder magnification is 2 (2 in step S19), the CPU 41 determines whether the focal length acquired in step S12 is equal to or smaller than the threshold 2A (step S20). When the focal length is equal to or smaller than the threshold 2A (YES in step S20), the CPU 41 sets the finder magnification to ×1 (step S22). When the focal length is larger than the threshold 2A (NO in step S20), the CPU 41 sets the finder magnification to ×2 (step S23).

When the finder magnification is ×3 (×3 in step S19), the CPU 41 determines whether the focal length acquired in step S12 is equal to or smaller than the threshold 2B (step S21). When the focal length is equal to or smaller than the threshold 2B (YES in step S21), the CPU 41 sets the finder magnification to ×2 (step S23). When the focal length is larger than the threshold 2B (NO in step S21), the CPU 41 sets the finder magnification to ×3 (step S24).

The CPU 41 determines whether the present finder magnification acquired in step S13 or S19 and the finder magnification determined in steps S16 to S18 or steps S22 to S24 are equal to each other (step S25). When they are equal to each other (YES in step S25), the CPU 41 proceeds to step S27. When the finder magnifications are different (NO in step S25), the CPU 41 inserts or removes the insertion lenses via the driver 23 and changes the present finder magnification to the finder magnification determined in steps S16 to S18 or steps S22 to S24 (step S26).

After the finder magnification is switched (step S26) or when the present finder magnification and the determined finder magnification are the same (YES in step S25), the CPU 41 displays the bright frame F on the electronic view finder 52 on the basis of the focal length acquired in step S11 and the finder magnification switched in step S26 (step S27).

According to this embodiment, when zooming is performed slowly (e.g., delicate angle of view adjustment is performed), the finder magnification is not switched during zoom driving to make it easy to perform angle of view adjustment. On the other hand, when zooming is performed all at once, it is possible to enable the user to immediately shift to the delicate angle of view adjustment after the zooming by making it possible to quickly switch the finder magnification.

In this embodiment, it is possible to change time until finder magnification switching according to the speed of zooming performed slowly. It is conceivable that the speed of zooming in determining an imaging angle of view is different depending on a user. Even when similar angle of view determination is performed, a person who can determine an imaging angle of view while quickly moving a zoom lens can also quickly determine whether the zoom lens is being moved or stopped. In such a case, it is better to quickly switch a finder magnification to allow the user to shift to imaging fast. Therefore, by changing the time until the finder magnification switching according to the speed of zooming, it is possible to switch a finder magnification at proper speed adjusted to the user and eliminate an unnecessary waiting time until the finder magnification switching.

<Modification of the Sixth Embodiment>

Figure 15A:
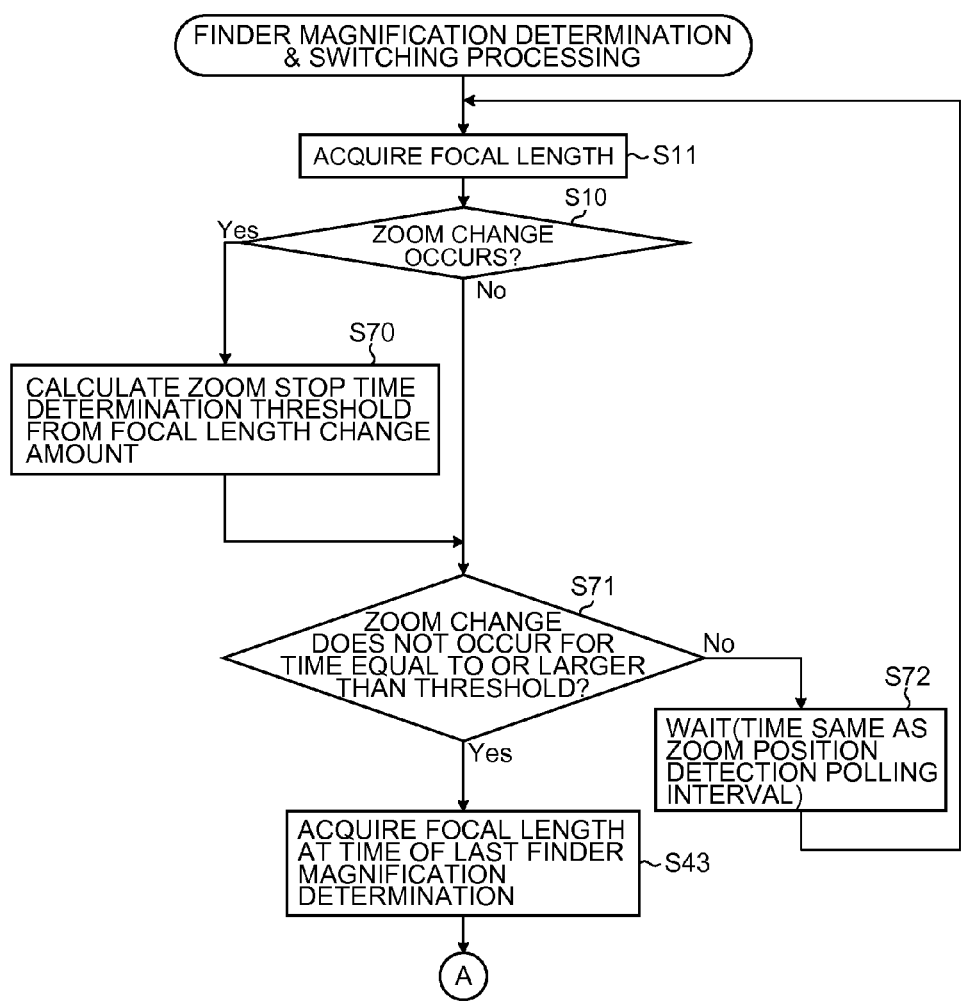
FIG. 15A is a flowchart illustrating a flow of finder magnification switching processing in a modification of the sixth embodiment.
Figure 15B:
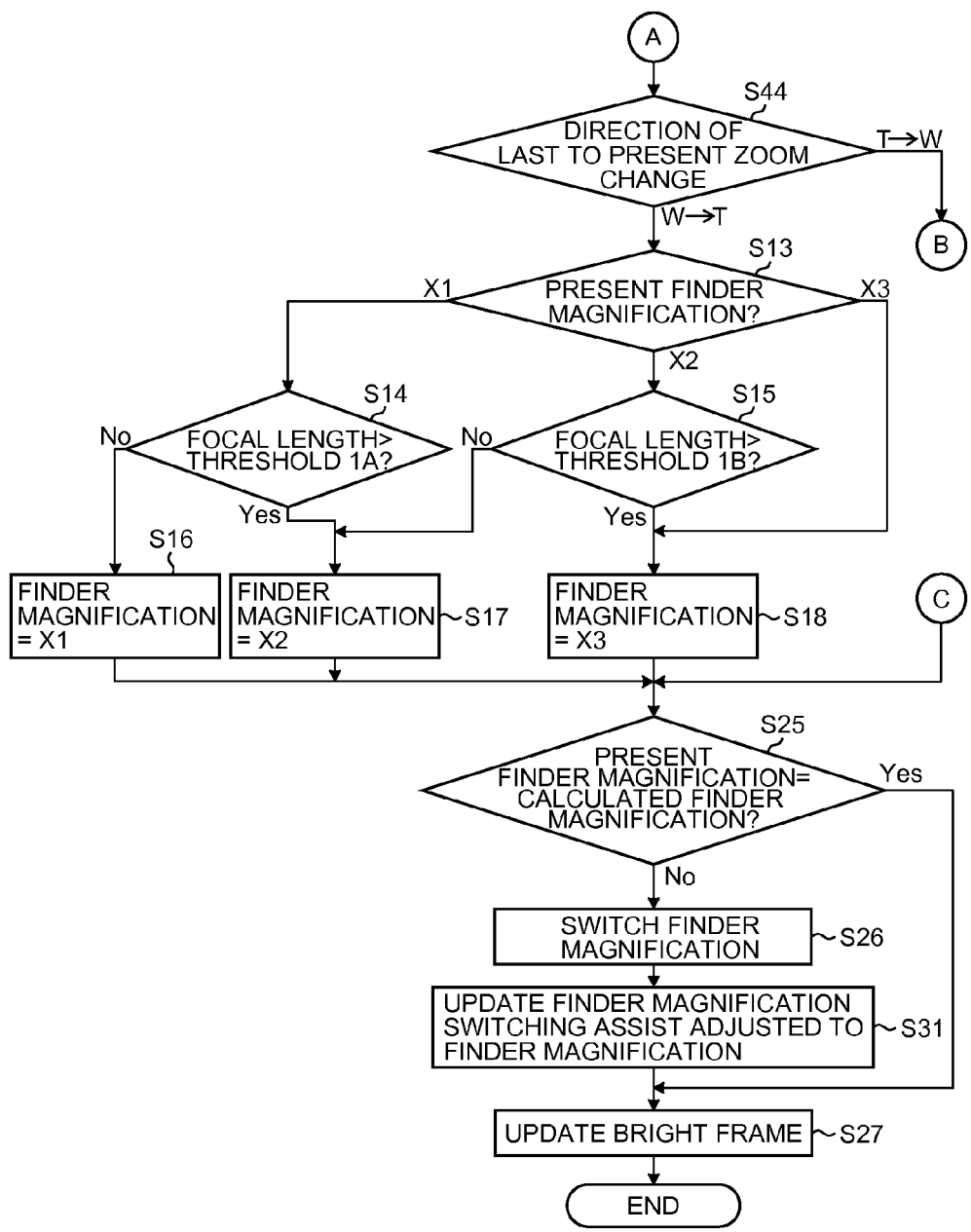
FIG. 15B is a flowchart (continued) illustrating the flow of the finder magnification switching processing in the modification of the sixth embodiment.
Figure 15C:
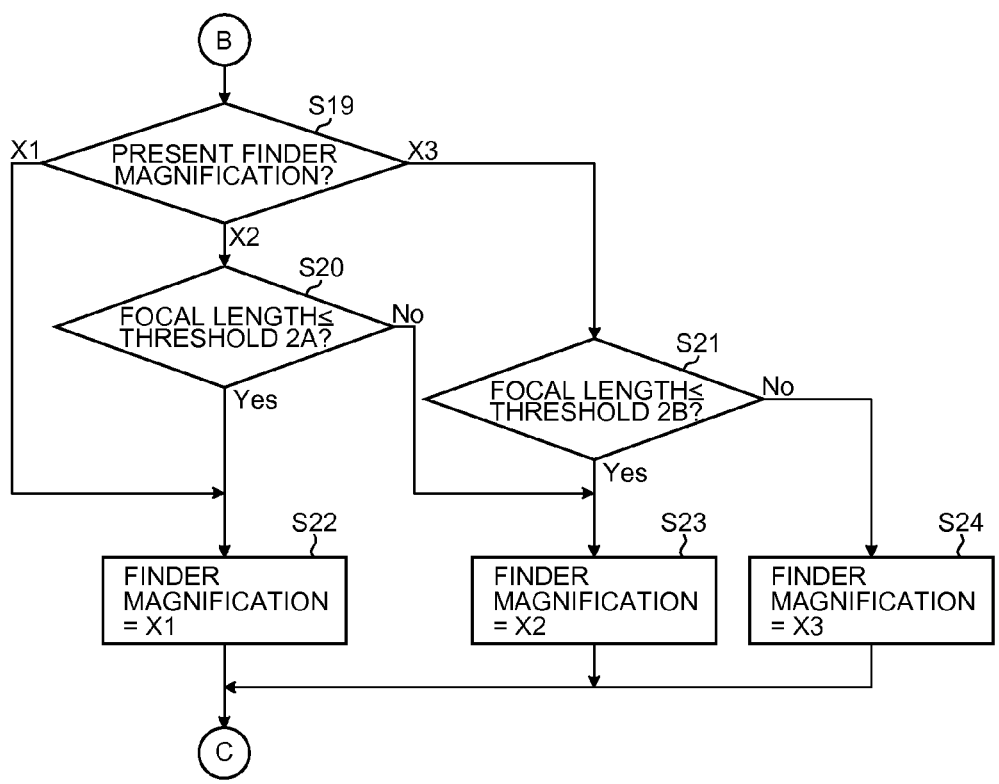
FIG. 15C is a flowchart (continued) illustrating the flow of the finder magnification switching processing in the modification of the sixth embodiment.

FIG. 15A to FIG. 15C are flowcharts illustrating a flow of processing for adjusting a finder magnification in a modification of the sixth embodiment. A difference between the sixth embodiment and the modification of the sixth embodiment is whether a finder magnification switching assist is displayed. Note that portions same as the portions illustrated in FIG. 13 are designated by the same reference characters and explanation of the portions is omitted.

After switching the finder magnification (step S26), the CPU 41 displays the finder magnification switching assist on the electronic view finder 52 on the basis of the focal length acquired in step S11 and the finder magnification switched in step S26 (step S31). Consequently, when zooming is performed or when the finder magnification changes, it is possible to update a bright frame and the finder magnification switching assist.

The embodiments of the presently disclosed subject matter are explained above. However, the technical scope of the presently disclosed subject matter is not limited to the scope described in the embodiments. It is evident for those skilled in the art that it is possible to add various alterations and improvements to the embodiments. It is evident from the description of claims that forms added with such alterations and improvements could also be included in the technical scope of the presently disclosed subject matter.

The presently disclosed subject matter can be provided as a computer-readable program code for causing a device (e.g., an electronic camera) to perform the processing explained above, a non-transitory and computer-readable recording medium (e.g., an optical disk (e.g., a CD (Compact Disc), a DVD (Digital Versatile Disc), or a BD (Blu-ray Disc)) or a magnetic disk (e.g., a hard disk or a magneto-optical disk)) in which the program code is stored, and a computer program product for storing an executable code for the method.

It should be noted that the execution order of the respective kinds of processing such as the operations, the procedures, the steps, and the stages in the device, the system, the program, and the method described and illustrated in the claims, the specification, and the drawings is not particularly clearly indicated as "before", "prior to", or the like and, unless an output of preceding processing is used in following processing, the respective kinds of processing can be realized in arbitrary order. Even if the operation flows in the claims, the specification, and the drawings are explained using "first,", "next," and the like for convenience, this does not mean that it is essential to carry out the operation flows in this order.

What is claimed is:

1. An imaging device comprising:
   an imaging unit configured to image light from an object passed through an imaging optical system to acquire a taken image;
   a zooming unit configured to continuously change an imaging magnification of the imaging optical system;
   an optical finder configured to observe an image of the object via a finder optical system different from the imaging optical system;
   a magnification varying unit configured to switch a finder magnification, which is a magnification of the finder optical system, from a first finder magnification to a second finder magnification when the imaging magnification increases to a first imaging magnification and switch the finder magnification from the second finder magnification to the first finder magnification when the imaging magnification decreases to a second imaging magnification smaller than the first imaging magnification; and
   a determining unit configured to determine whether the magnification of the taken image is not changed for a predetermined time after the magnification of the taken image is changed to the first imaging magnification or the second imaging magnification by the zooming unit,
   wherein the magnification varying unit changes the finder magnification when the determining unit determines that the magnification of the taken image is not changed for the predetermined time.

2. The imaging device according to claim 1, further comprising:
   a display unit configured to display an image indicating an imaging angle of view of the taken image; and
   an image superimposing unit configured to superimpose the image displayed by the display unit on an object image observed by the optical finder to display the image.

3. The imaging device according to claim 2,
   wherein the display unit further displays a mark indicating the imaging angle of view at which the finder magnification is changed.

4. The imaging device according to claim 1,
   wherein the magnification varying unit changes the finder magnification to a minimum magnification while the magnification of the taken image is being changed.

5. The imaging device according to claim 1, further comprising
   a change amount detecting unit configured to detect a change amount of the magnification of the taken image when the magnification of the taken image is changed,
   wherein when the change amount of the magnification of the taken image is equal to or smaller than a predetermined value, the magnification varying unit changes the finder magnification when the determining unit determines that the predetermined time has elapsed.

6. The imaging device according to claim 5, further comprising
   a predetermined time changing unit configured to change the predetermined time according to the change amount detected by the change amount detecting unit.

7. The imaging device according to claim 6,
   wherein the predetermined time changing unit changes the predetermined time to be shorter as the change amount is larger.

8. An imaging method comprising:
   a step of imaging light from an object passed through an imaging optical system to acquire a taken image;
   a step of changing an imaging magnification of the imaging optical system;
   a step of changing a finder magnification, which is a magnification of a finder optical system different from the imaging optical system, according to the imaging magnification, switching the finder magnification from a first finder magnification to a second finder magnification when the imaging magnification increases to a first imaging magnification and switching the finder magnification from the second finder magnification to the first finder magnification when the imaging magnification decreases to a second imaging magnification smaller than the first imaging magnification; and
   a step of determining whether the magnification of the taken image is not changed for a predetermined time after the magnification of the taken image is changed to the first imaging magnification or the second imaging magnification by the zooming unit,
   wherein the step of changing the finder magnification changes the finder magnification when the determining unit determines that the magnification of the taken image is not changed for the predetermined time.

9. A non-transitory and computer-readable recording medium, wherein when a command stored in the recording medium is read by a processor, the processor executes:
   a step of imaging light from an object passed through an imaging optical system to acquire a taken image;
   a step of changing an imaging magnification of the imaging optical system;
   a step of changing a finder magnification, which is a magnification of a finder optical system different from the imaging optical system, according to the imaging magnification, switching the finder magnification from a first finder magnification to a second finder magnification when the imaging magnification increases to a first imaging magnification and switching the finder magnification from the second finder magnification to the first finder magnification when the imaging magnification decreases to a second imaging magnification smaller than the first imaging magnification; and a step of determining whether the magnification of the taken image is not changed for a predetermined time after the magnification of the taken image is changed to the first imaging magnification or the second imaging magnification by the zooming unit, wherein the step of changing the finder magnification changes the finder magnification When the determining unit determines that the magnification of the taken image is not changed for the predetermined time.

* * * * *